US012780340B2

(12) United States Patent
Alessandrini

(10) Patent No.: US 12,780,340 B2
(45) Date of Patent: Nov. 3, 2026

(54) SCOOTER

(71) Applicant: COSMOGAS S.R.L., Meldola (IT)

(72) Inventor: Arturo Alessandrini, Meldola (IT)

(73) Assignee: CLADA S.R.L., Meldola (IT)

( * ) Notice: Subject to any disclaimer, the term of this patent is extended or adjusted under 35 U.S.C. 154(b) by 462 days.

(21) Appl. No.: 18/553,689

(22) PCT Filed: Mar. 23, 2022

(86) PCT No.: PCT/IB2022/052642
§ 371 (c)(1),
(2) Date: Oct. 2, 2023

(87) PCT Pub. No.: WO2022/208237
PCT Pub. Date: Oct. 6, 2022

(65) Prior Publication Data

US 2024/0199155 A1 Jun. 20, 2024

(30) Foreign Application Priority Data

Apr. 2, 2021 (IT) ........................ 102021000008402

(51) Int. Cl.
*B62H 1/04* (2006.01)
*B62K 3/00* (2006.01)

(52) U.S. Cl.
CPC ............... *B62H 1/04* (2013.01); *B62K 3/002* (2013.01)

(58) Field of Classification Search
CPC ................................. B62H 1/04; B62K 3/002
See application file for complete search history.

(56) References Cited

U.S. PATENT DOCUMENTS 4,826,194 A 5/1989 Sakita
5,224,724 A * 7/1993 Greenwood ........... B62K 3/002 280/87.1

(Continued)

FOREIGN PATENT DOCUMENTS

CN 108263527 A 7/2018
CN 213083363 U 4/2021

(Continued)

OTHER PUBLICATIONS

International Search Report and Written Opinion of the ISA for PCT/IB2022/052642 mailed May 20, 2022, 10 pages.

*Primary Examiner* — Drew J Brown
(74) *Attorney, Agent, or Firm* — Nixon & Vanderhye P.C.; Lars H. Genieser

(57) ABSTRACT

A scooter comprises a platform (2) with an associated guiding structure (3), the platform (2) being mounted on wheels and having a support surface (2*a*) suitable to support at least one foot (RF) of a user. The platform (2) has a kickstand device (10) associated thereto, having a kickstand body that includes at least one supporting element (11*a*, 11*b*). The kickstand body has an upper end portion and at least one lower end portion (15), and is articulated in an intermediate area thereof to the platform (2), to perform angular movements around a respective rotation axis that extends transversely with respect to a direction of longitudinal extension of the platform (2). At least one elastic element is operatively set between the kickstand body and the platform (2), configured to urge the kickstand body to assume a respective operative lowered position, in which a lower end part (15) of the at least one supporting element (11*a*, 11*b*) is designed to contact the ground. The upper end portion of the kickstand body defines or has an operable element (12) associated thereto, configured so as to extend at least partially above the support surface (2*a*) of the (Continued)

platform (2), and suitable to be pressed by said foot (RF) of the user, in such a way that the kickstand body (10*a*) is brought to assume a respective inoperative raised position, against the action of the at least one elastic element, in which the lower end part (15) of the at least one supporting element (11*a*, 11*b*) is raised with respect to the ground.

18 Claims, 14 Drawing Sheets

(56) References Cited

U.S. PATENT DOCUMENTS

| | | | | |
|---|---|---|---|---|
| 10,398,961 | B2 | 9/2019 | McGowan et al. | |
| 12,128,982 | B1 * | 10/2024 | Kuo | B62K 15/006 |
| 2002/0093164 | A1 * | 7/2002 | Tai | B62K 3/002 280/87.041 |
| 2010/0096823 | A1 * | 4/2010 | Stillinger | B62K 3/002 280/87.021 |
| 2018/0065702 | A1 * | 3/2018 | Desberg | B62K 15/006 |
| 2022/0185409 | A1 * | 6/2022 | Guo | B62H 5/02 |

FOREIGN PATENT DOCUMENTS

| | | | | |
|---|---|---|---|---|
| DE | 19633061 | C1 | 1/1998 | |
| EP | 3868635 | A1 * | 8/2021 | B62H 1/02 |
| FI | 20195639 | A1 * | 1/2021 | B62K 21/18 |
| KR | 20150002128 | U * | 6/2015 | B62B 5/023 |
| KR | 102199963 | B1 | 1/2021 | |
| MA | 38468 | A1 * | 7/2016 | B62H 1/04 |
| TW | M509154 | U | 9/2015 | |
| WO | 2001015961 | A2 | 3/2001 | |
| WO | 2006000679 | A1 | 1/2006 | |
| WO | WO-2017211792 | A1 * | 12/2017 | B62K 15/00 |

* cited by examiner

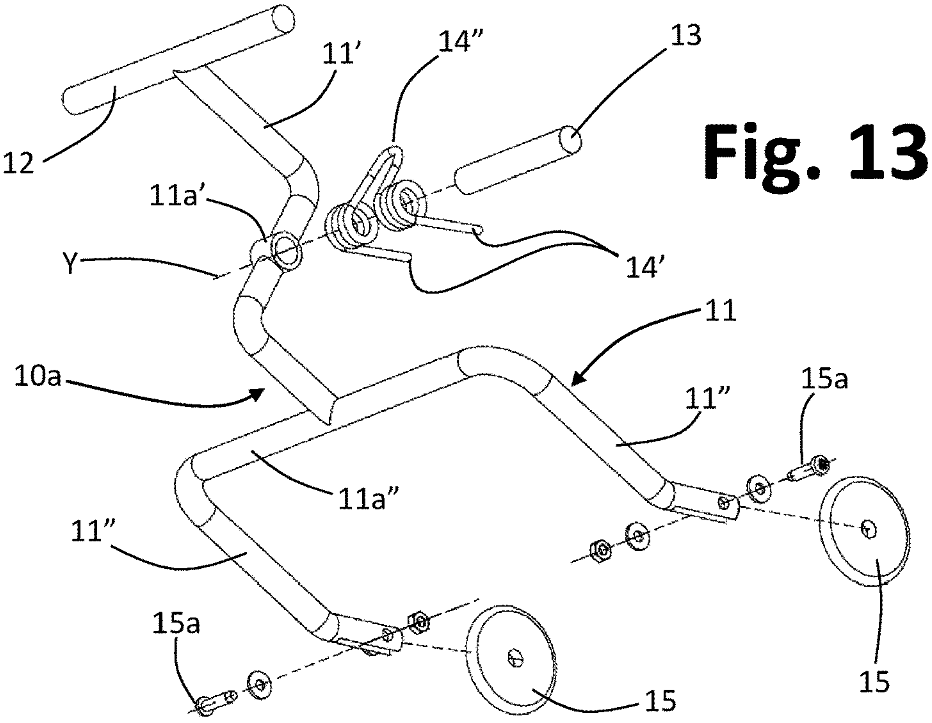
Fig. 13
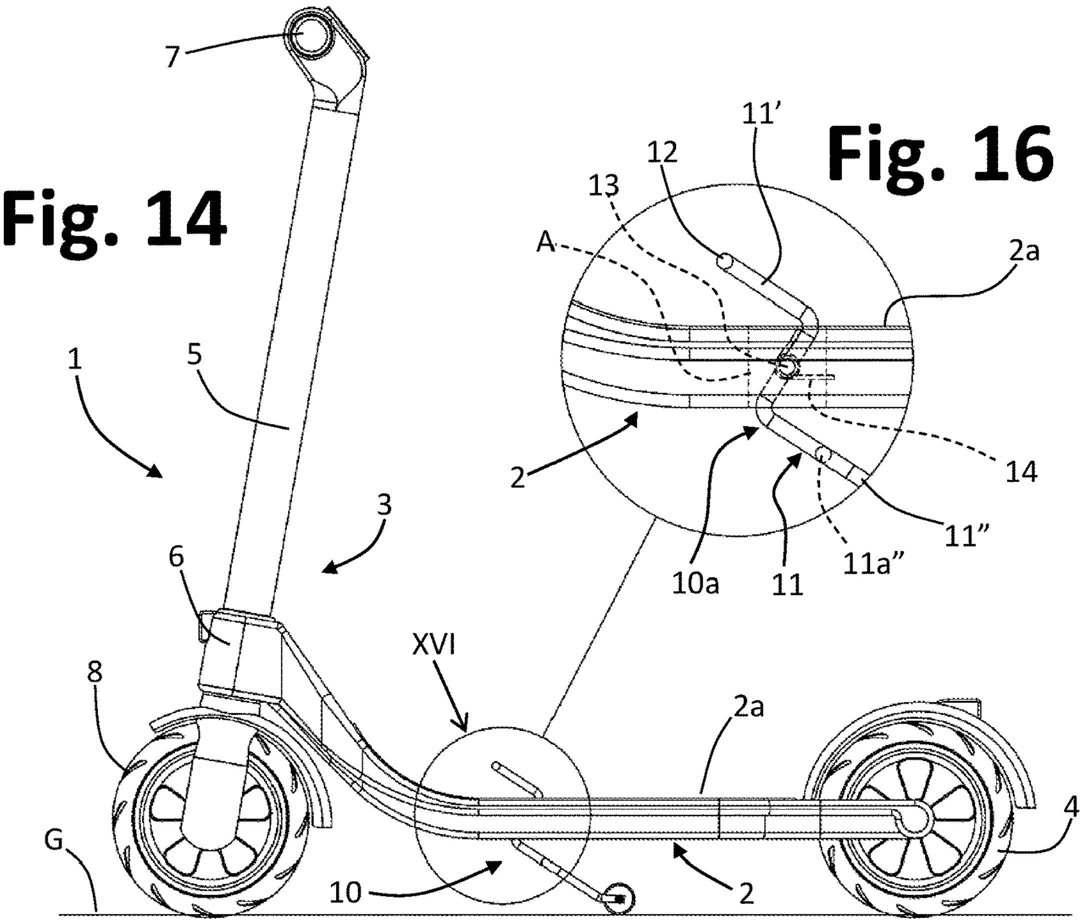
Fig. 14
Fig. 16

Fig. 20
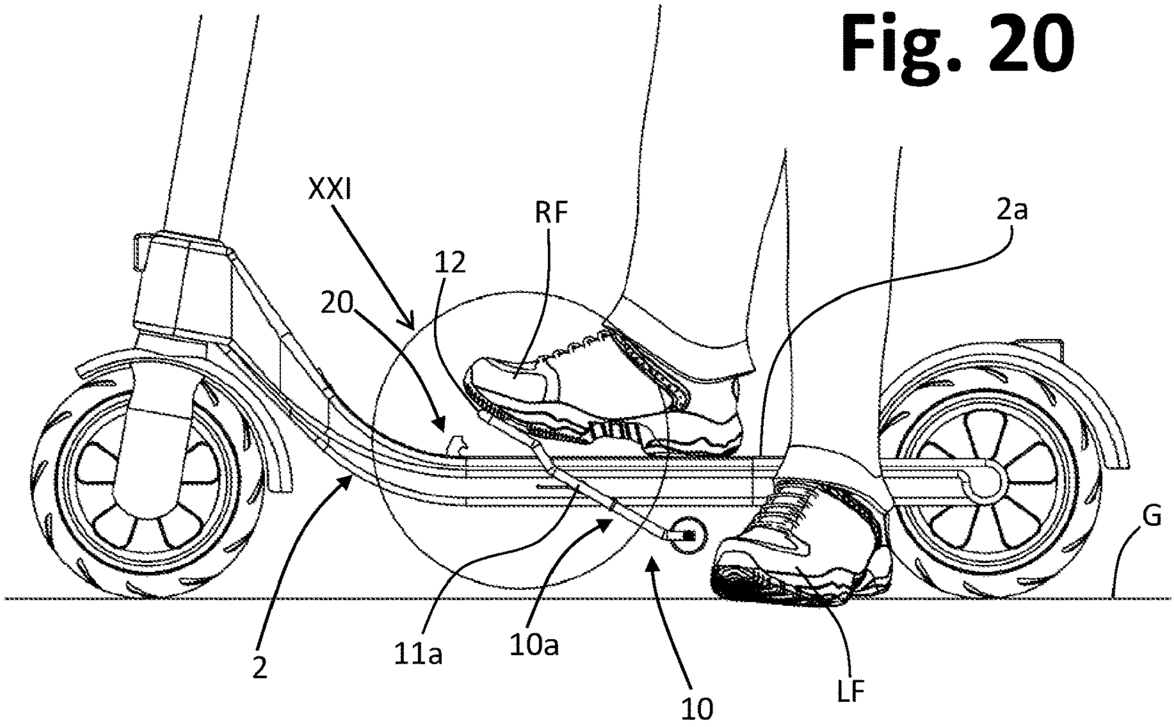
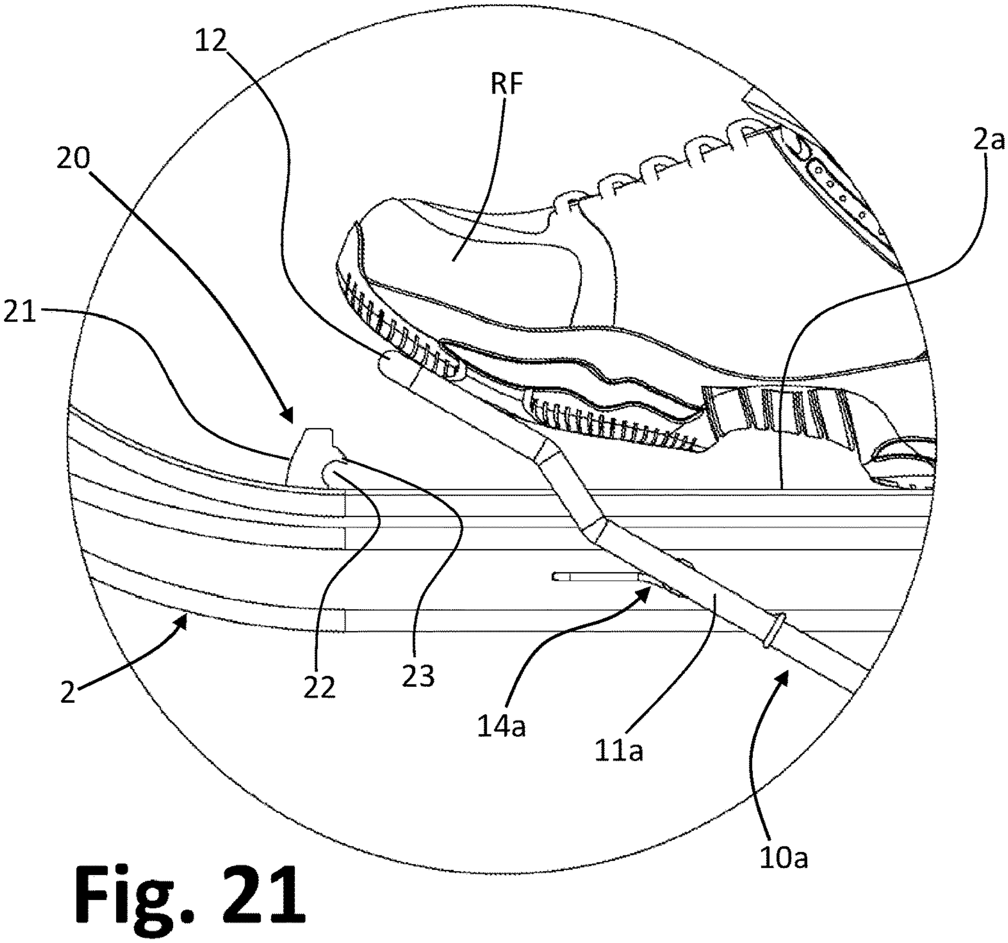
Fig. 21

Fig. 26
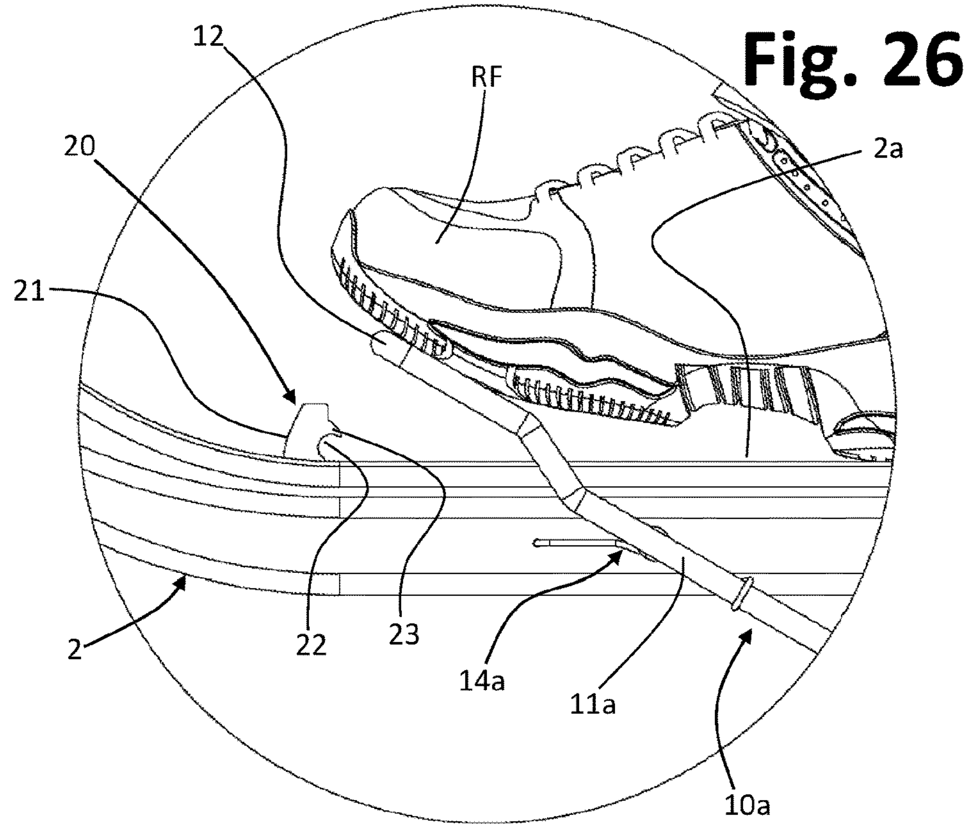
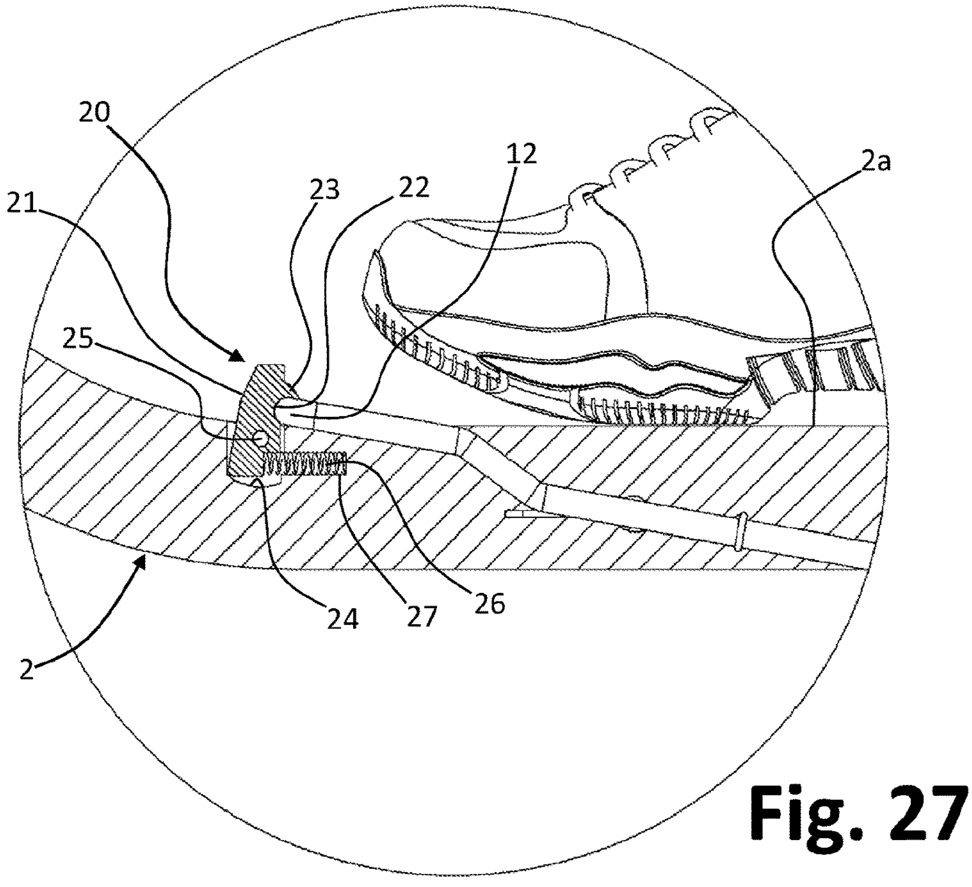
Fig. 27

SCOOTER

CROSS-REFERENCE TO RELATED APPLICATIONS

This application is the U.S. national phase of International Application No. PCT/IB2022/052642 filed Mar. 23, 2022 which designated the U.S. and claims priority to IT 102021000008402 filed Apr. 2, 2021, the entire contents of each of which are hereby incorporated by reference.

FIELD OF THE INVENTION

The present invention refers in general to scooters, and has been developed with particular reference to the creation of kickstands or similar supporting or parking devices, suitable for use on scooters.

Background Art

The scooter has experienced a considerable return of interest in recent years, tied in particular to the development construction forms which are compact—usually having a folding structure—and of a low weight, as they are made of a light metal material such as aluminum. The most recent interest in forms of individual mobility in the city area is also due to practical reasons, to a growing awareness of ecological issues—which prompt people to reduce the environmental impact in travelling—and to the desire or the need to avoid the use of excessively crowded public transport (a need, the latter, particularly felt in the current pandemic condition).

The proliferation of scooter rental services has further expanded the availability and circulation of these means of transport in the city area. This possibility of widespread rental, generally in shared mode (the so-called "sharing") brings about the consequence that, after use, the scooters are left by users where it happens, very often without paying particular attention to their parking. Although many scooters are equipped with a side-opening kickstand, this parking device is not often used, such that it is not uncommon to find scooters leaning against a wall facing a sidewalk in the city area, thereby creating an obstacle to pedestrians, or even left on the ground. The non-use of the kickstand is generally caused by the negligence of some scooter users, this circumstance being probably tied to the fact that the operation of opening the kickstand itself—which has a rather small size—is not particularly easy.

SUMMARY OF THE INVENTION

In view of the above, the present invention essentially proposes to obtain a scooter equipped with an improved kickstand device, that is a kickstand device designed so as to make use thereof easier. This and other aims, which will be clearer hereinafter, are achieved according to the invention by a scooter having the characteristics recalled in the attached claims. The claims form an integral part of the technical teaching supplied herein in relation to the invention.

BRIEF DESCRIPTION OF THE DRAWINGS

Further aims, characteristics and advantages of the invention will result from the following description, made with reference to the attached drawings, provided purely by way of non-limiting example only, wherein:

FIGS. 12 and 13 are schematic views, respectively a perspective view and an exploded view, of a kickstand device according to possible variant embodiments;

FIGS. 14 and 15 are schematic views, respectively in side and in front elevation, of a scooter according to possible variant embodiments;

FIG. 16 shows the detail XVI of FIG. 14;

FIG. 20 is a schematic view in side elevation of a scooter according to further possible variant embodiments of the invention, provided with a locking mechanism in a first condition;

FIG. 21 shows the detail XXI of FIG. 20, with the aforementioned locking mechanism in a release condition;

FIG. 26 is a view similar to that of FIG. 25, at a terminal stage of switching the locking device to the release position, and FIGS. 27 and 28 are views similar to those in FIGS. 23 and 25, but partially sectioned to illustrate a possible structure of the locking device.

DESCRIPTION OF PREFERRED EMBODIMENTS OF THE INVENTION

The reference to "an embodiment" and the like in this description indicates that at least one particular configuration, structure, or characteristic described in relation to the embodiment is included in at least one embodiment. Thus, phrases such as "in one embodiment", "in an embodiment", "in various embodiments" and the like, possibly present in different places of this description, do not necessarily refer to the same embodiment, but may instead refer to different embodiments. In addition, particular conformations, structures or characteristics defined within this description may be combined in any appropriate way in one or more embodiments, even different from those depicted. The numerical and spatial references (such as "upper", "lower", "top", "bottom", "front", "back", "vertical", etc.) used herein, particularly in reference to the examples in the figures, are only for convenience and therefore do not define the scope of protection or the scope of the embodiments. The terms "front" and "rear", as used in this description, refer to the normal direction of advancement of the scooter described. In this description and in the attached claims, the generic term "material" shall also include mixtures, compositions or alloys of several different materials. The same reference numbers are used in the figures to indicate similar or technically equivalent elements.

Figure 1:
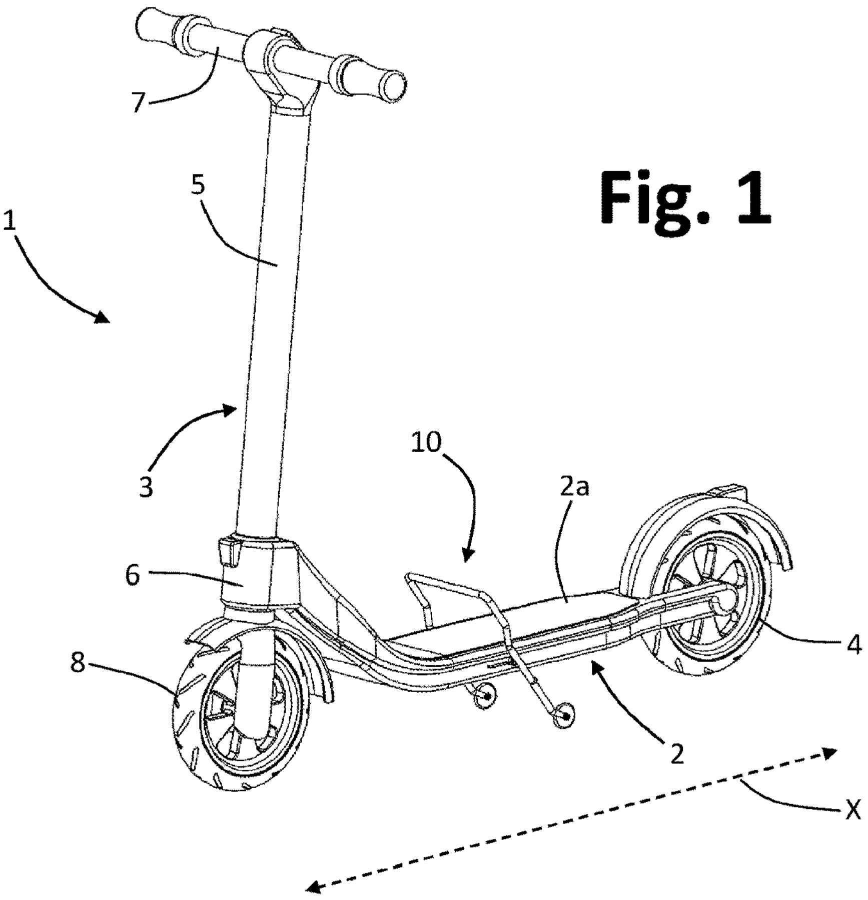
FIG. 1 is a schematic perspective view of a scooter according to possible embodiments of the invention.
Figure 2:
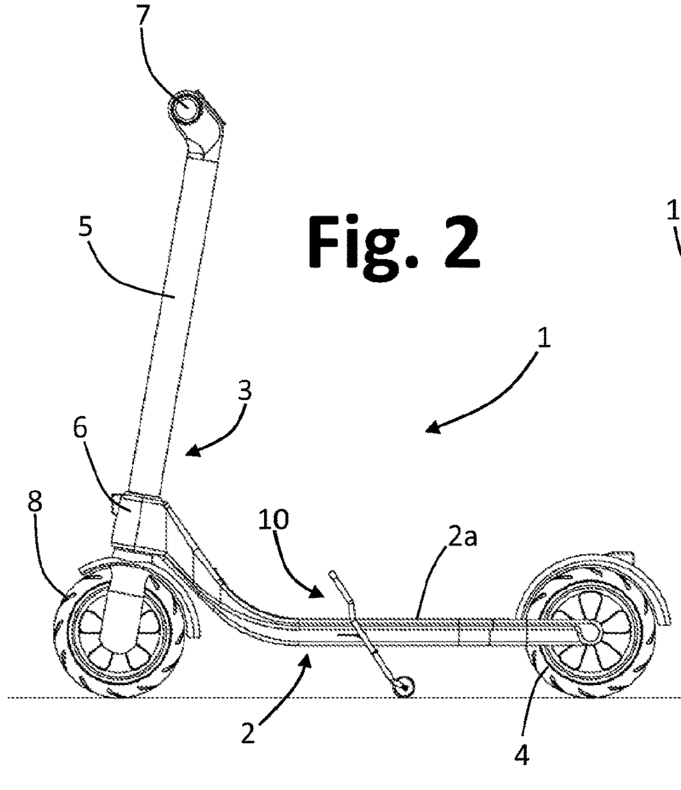
FIGS. 2 and 3 are schematic views, respectively in side and front elevation, of a scooter according to possible embodiments of the invention.
Figure 3:
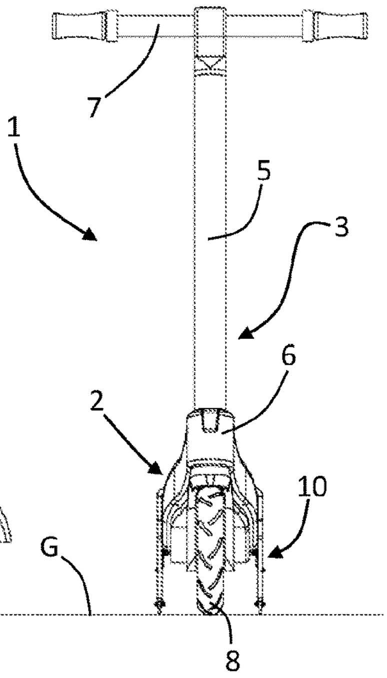

Referring initially to FIGS. 1-3, with 1 is indicated as a whole a vehicle of the type currently called scooter. According to a configuration widely known per se, the scooter 1 essentially comprises a platform mounted on wheels for resting on the ground, with an associated guiding or driving structure.

Referring to the non-limiting example shown, the platform, indicated as a whole with 2, has an overall elongated shape and is designed to extend, in the normal condition of use, in a substantially horizontal direction. The platform 2 is made in the form of a structural element, preferably but not necessarily a ribbed element, formed with plastic material, or metal material, or composite material.

The platform 2 can have a footboard, or in any case define or have associated thereto a surface 2*a* for the support of at least one foot of a user. The rear portion of the platform 2, which preferably develops as a fork, has a rear wheel 4 rotatably associated thereto.

Still referring to the non-limiting example shown, the guiding structure, indicated as a whole with 3, comprises a steering or rotating column 5, which is inserted into a sleeve 6 defined in, or associated to, the front portion of the platform 2. The upper end of the column 5 a handle or handlebar 7 is associated, while the lower end of the column 5 has a front wheel 8 rotatably associated thereto; for this purpose, the lower end of the column 5 is preferably configured as a fork. The handlebar 7 allows the subject using the scooter 1 both to stand on it and to selectively orient the front wheel 8, with a typical steering action.

The specific construction details of the scooter 1 as a whole are to be considered known in the art—with the exception of the kickstand devices described below—and therefore they do not require a detailed description herein, also because they are not relevant for the purpose of understanding the invention.

The platform 2 has a kickstand device associated thereto, indicated as a whole with 10, which in FIGS. 1-3 is shown in a respective lowered operating position, for the support of the scooter 1 in an upright position.

Figure 4:
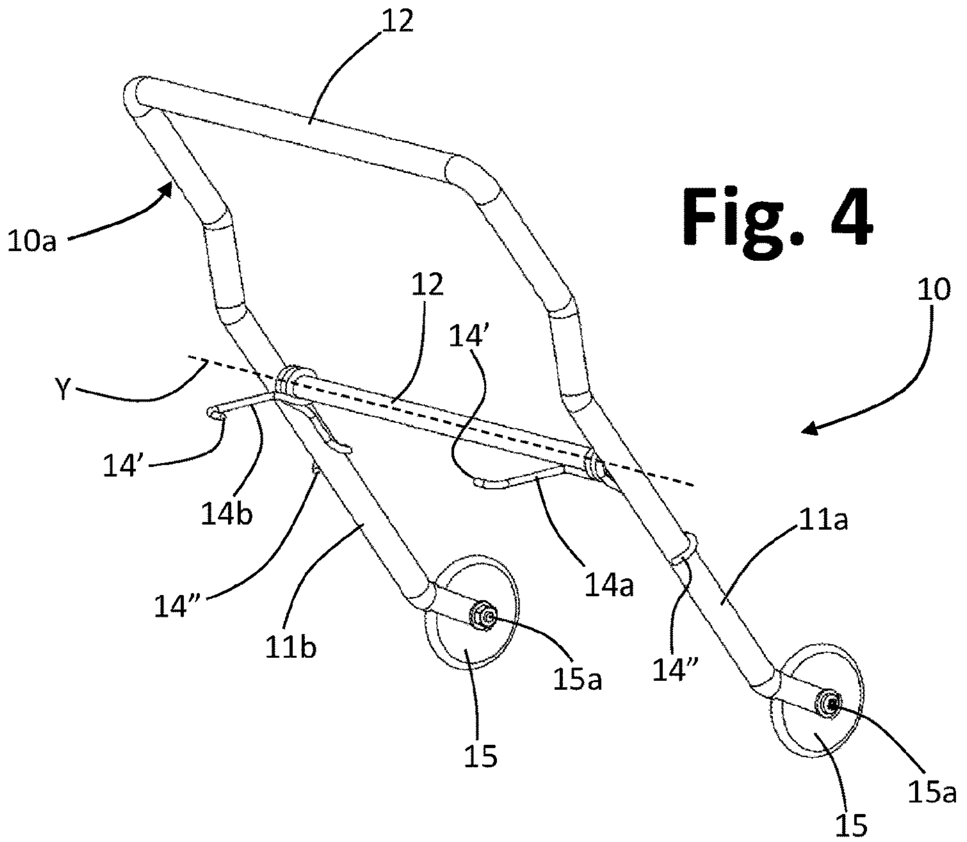
FIG. 4 is a schematic perspective view of a kickstand device of a scooter according to possible embodiments of the invention.
Figure 5:
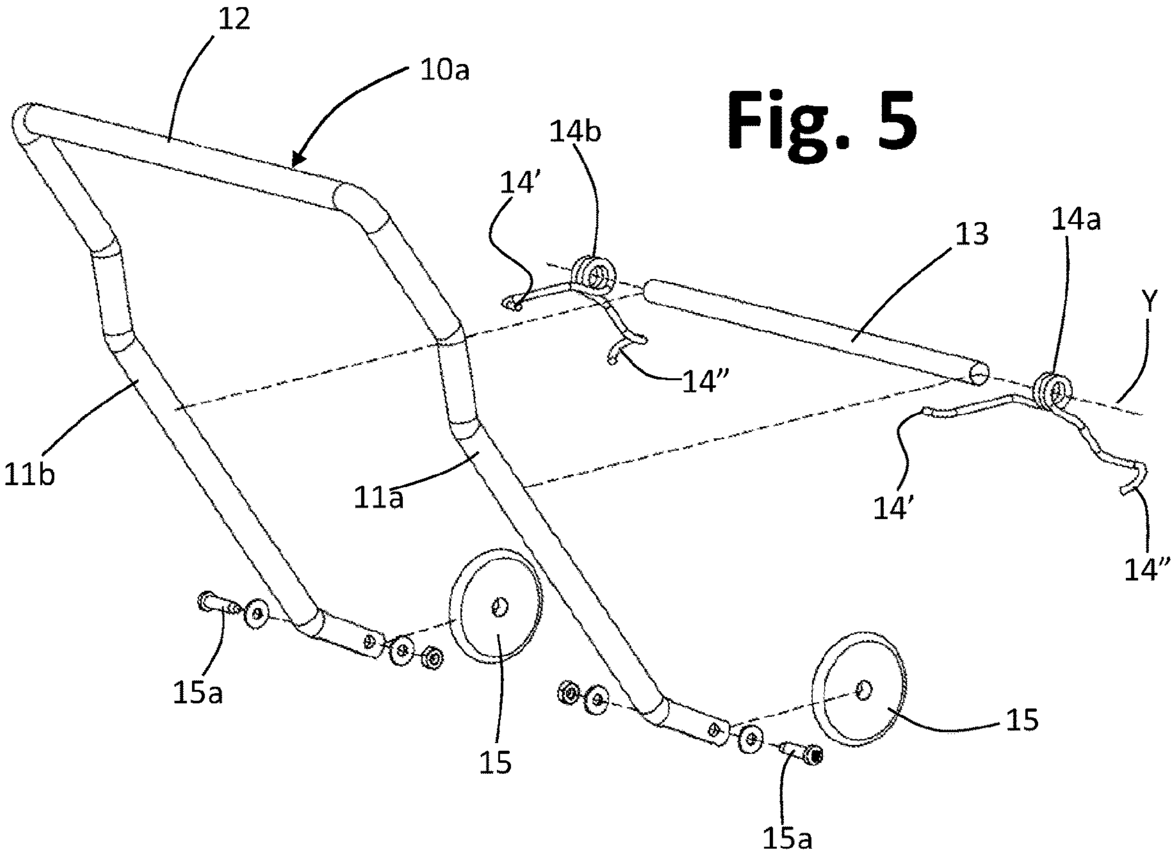
FIG. 5 is an exploded schematic view of the kickstand device of FIG. 4.

The kickstand device 10 is shown in isolation, by means of a perspective view and an exploded view, in FIGS. 4 and 5.

According to a characteristic of the invention, the kickstand device 10 has a kickstand body, configured overall as a first-class lever, which comprises at least one supporting element and which is articulated in an intermediate zone thereof to the platform 2. In the preferential case shown in FIGS. 4-5, the kickstand body—designated by 10*a* in FIGS. 4-5—includes two supporting elements, designated by 11*a* and 11*b*, each of which is intended to be pivoted or hinged to a respective longitudinal flank of the platform 2, in order to perform angular movements around an axis of rotation designated by Y.

According to a further characteristic of the invention, between the kickstand body 10*a* and the platform 2, at least one elastic element, such as a spring, is operatively set, this elastic element being configured to urge said body 10*a*, or the at least one supporting element 11*a*, 11*b*, to assume a respective lowered operating position, in which a lower end part of the at least one supporting element 11*a*, 11*a*, is intended for contact with the ground, indicated by G for example in FIGS. 2-3. In the preferential case shown in FIGS. 4-5, the kickstand 10 device includes two elastic elements, designated by 14*a* and 14*b*, each of which is intended to elastically urge a respective supporting element 11*a* or 11*b* in the lowered operating position thereof. In various advantageous embodiments, the aforementioned lower end part of the at least one supporting element 11*a*, 11*b* comprises a roller or wheel 15, which is rotatable about an axis substantially parallel to the axis of rotation Y.

According to a further characteristic of the invention, an upper end part of the kickstand body 10*a*, or of the at least one supporting element 11*a*, 11*b*, defines or has an operable element associated thereto, which is configured to extend at least partially above the surface or footboard 2*a*. The operable element 12 is suitable to be pressed by one foot of the user, in such a way that the at least one supporting element 11*a*. 11*b* is brought to assume a respective raised inoperative position, against the action of the at least one elastic element 14*a*, 14*b*, wherein in said inoperative position the lower end part 15 of the at least one supporting element 11*a*, 11*b* is raised with respect to the ground G.

Referring again to the preferential case shown in FIGS. 4-5, one said operable element is designated as a whole with 12, and extends substantially transversely with respect to the direction of longitudinal extension (indicated with X in FIG. 1) of the platform 2, in particular in a direction substantially parallel to the axis of rotation Y. In the preferential case shown, the operable element 12 mutually connects the upper ends of the two supporting elements 11*a* and 11*b*; for this purpose, in particularly advantageous embodiments, the first supporting element 11*a*, the second supporting element 11*b* and the operable element 12 are defined at least in part by a kickstand body 10*a* in a single piece, which is configured substantially as an inverted U: this does not, however, constitute an essential characteristic, because the kickstand body could be formed by several assembled components, and because the kickstand body could define even a single supporting element 11*a* or 11*b* (in which case the single supporting element 11*a* or 11*b* and the operable element 12 may be defined at least in part by a kickstand body 10*a* in a single piece), or have a different conformation, for example as described below.

The kickstand body 10*a* is preferably a substantially tubular body, for example formed with metal material, and the supporting elements 11*a* and 11*b*, when both present, are preferably substantially parallel to each other. The two supporting elements 11*a* and 11*b* are not necessarily straight, since they may have one or more intermediate bends, as in the example shown.

As mentioned, the lower end part of each supporting element 11*a*, 11*b* preferably includes a wheel 15. For this purpose, the lower ends of the two elements 11*a*, 11*b* of the kickstand body 10*a* may be shaped like a fork, for coupling of the wheels 15 by means of a suitable pin 15*a* (for example comprising a screw, a nut and washers, as exemplified).

The kickstand 10 preferably comprises at least one pivot, to hinge the kickstand body 10*a*, or the at least one supporting element 11*a*, 11*b*, to the platform 2. Referring again to the preferential case shown in the figures, the two supporting elements 11*a* and 11*b* are each pivoted at a respective longitudinal flank of the platform 2, in their intermediate zone, preferably by means of one and the same pivot pin, indicated as a whole with 13. Such a pivot pin 13, preferably made of metal material, preferably extends through the platform 2, in a transverse direction with respect to the direction of longitudinal extension X (FIG. 1) of the platform itself. For this purpose, for example, the platform 2 can be provided with a hole or seat or transverse passage, for partial housing of the pin 13, whose opposite ends protrude instead from the two longitudinal flanks of the platform (see for example FIG. 10). The way of coupling the two protruding ends of the pin 13 to the intermediate zones of the respective supporting elements 11*a*, 11*b* are not shown in the figures, as such coupling may be achieved in any known manner (for example by welding or by threaded locking members).

In various preferential embodiments, the at least one elastic element 14*a*, 14*b* of the kickstand 10 comprises a torsion spring, which is fitted on a portion of the pivot pin, in particular a portion protruding laterally from the platform 2, the two ends of the spring being constrained or resting on the platform and the corresponding supporting element, respectively. Preferably, each spring 14*a*, 14*b* has a first end 14' designed to be constrained to, or to rest on, the platform 2, and a second end 14" designed to be constrained to, or to rest on, the kickstand body 10*a*, in particular on a corresponding supporting element 11*a* or 11*b*; for this purpose, preferably, the second end 14" of the spring 14*a* or 14*b* is at least partly curved.

Figure 10:
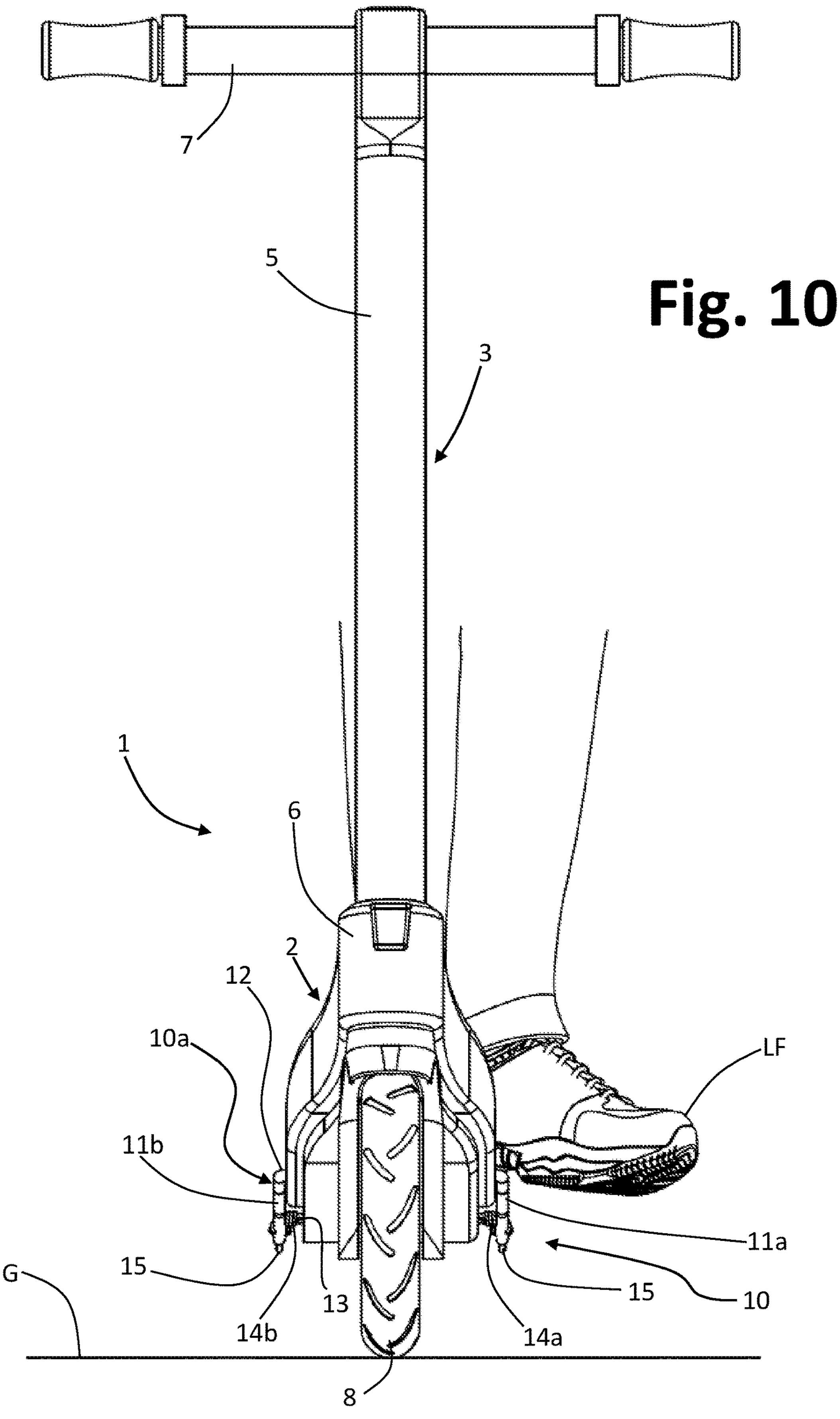

In the preferential case shown, both torsion springs 14*a* and 14*b* are fitted on the common pivot 13, at the corresponding ends that protrude at the two opposite longitudinal flanks of platform 2, as can be seen for example in FIG. 10.

The ways of use of the kickstand 10 device that equips the scooter 1 are very simple, and are schematized in FIGS. 6-10.

Figure 6:
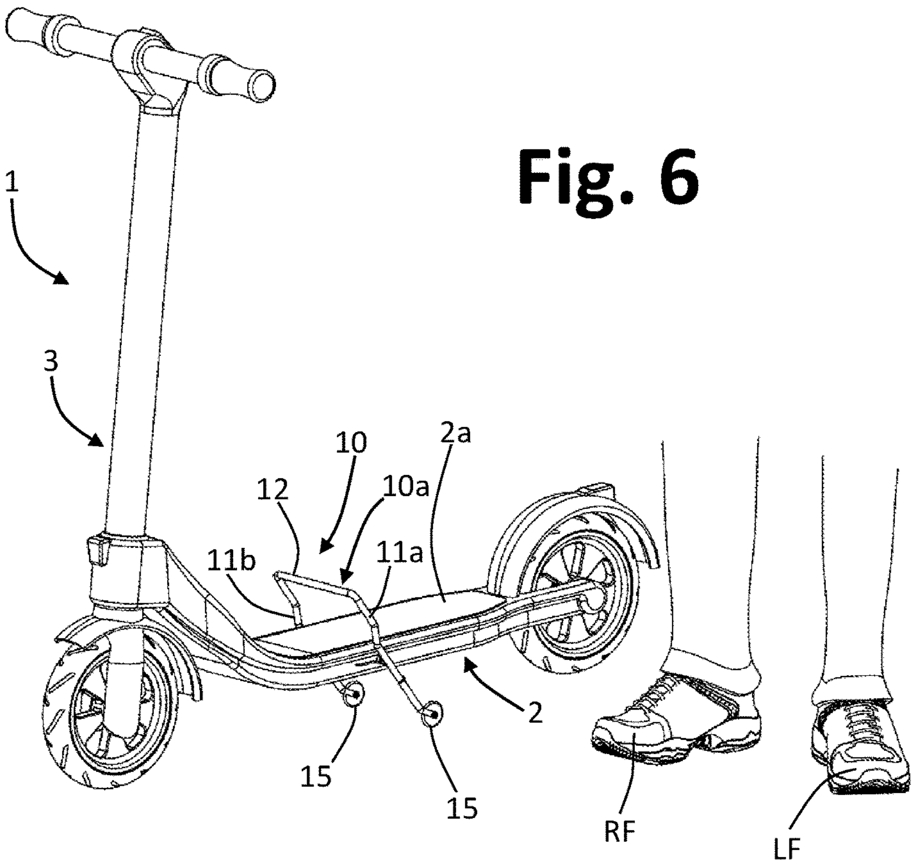
FIGS. 6, 7 and 8 are schematic perspective representations aimed at exemplifying a possible mode of use of a scooter in accordance with possible embodiments of the invention.

FIG. 6 illustrates the scooter 1 in the parking mode, already highlighted in FIGS. 1-3, in which the kickstand device 10 (i.e., the body 10*a* with its supporting elements 11*a* and 11*b*) is in the lowered operating position, thanks to the reaction force of the elastic elements represented by the springs 14*a* and 14*b*. In this condition, the wheels 15 that obtain the lower ends of the supporting elements 11*a* and 11*b* are in contact with the ground. It will be appreciated that presence of the wheels 15 is advantageous while parking, since they avoid direct sliding of the kickstand device 10 on the ground. In the preferential case shown, given the presence of the two supporting elements 11*a* and 11*b* generally parallel to each other, the scooter 1 is supported in a substantially vertical position. Clearly, the springs 14*a* and 14*b* are sized for that purpose (for example to exert a force of about 10 Kg).

Figure 7:
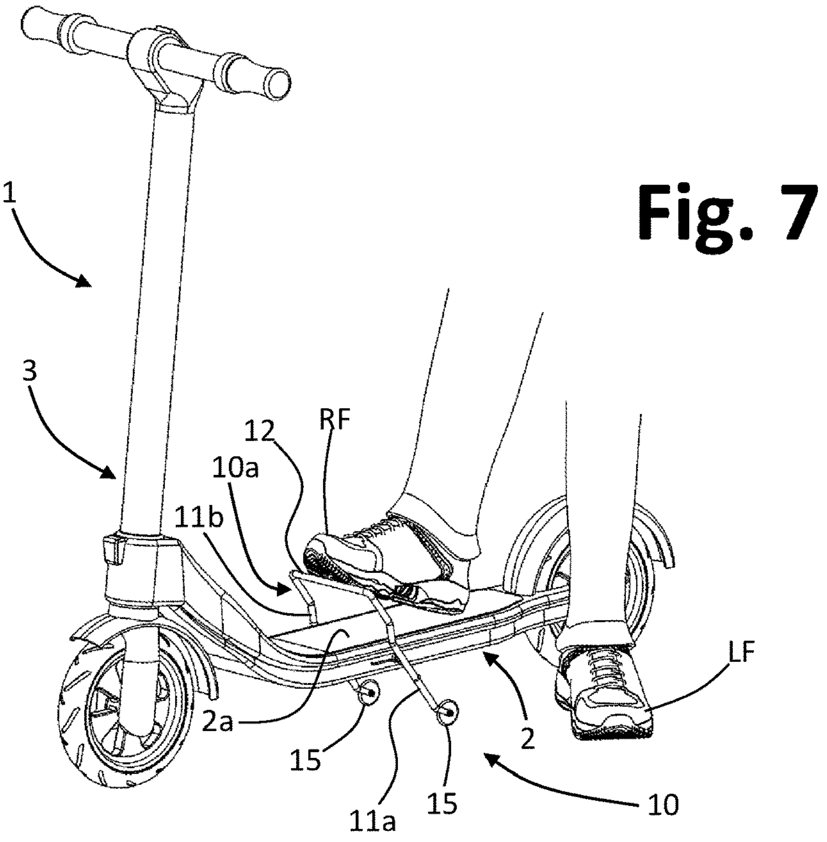

FIG. 7 illustrates the scooter 1 in a mode of start of use, in which a user starts resting a first foot—here the right foot RF—on the surface or footboard 2*a*, so as to overlap part of the sole of the corresponding shoe to the operable element 12 of the kickstand device 10; the user supports himself at the same time on the ground with the second foot, here the left foot LF (of course, depending on the habits or preferences of the user, the use of the feet can be reversed with respect to the example described here, that is, with the LF foot intended to press on the operable element 12, and the other foot RF intended for support on the ground and the subsequent push).

Subsequently, by bringing more weight on the first foot RF, or in any case by pressing the foot itself on the operable element 12, the lifting of the kickstand device 10 is induced, that is, its passage to the inoperative raised condition, against the action of the springs 14*a* and 14*b*. By exerting a push on the ground by means of the second foot LF, the user can then advance the scooter 1 on its wheels 4, 8, possibly also bringing the second foot LF on the footboard 2*a*: a condition of this type is shown in FIGS. 8-10.

Figure 8:
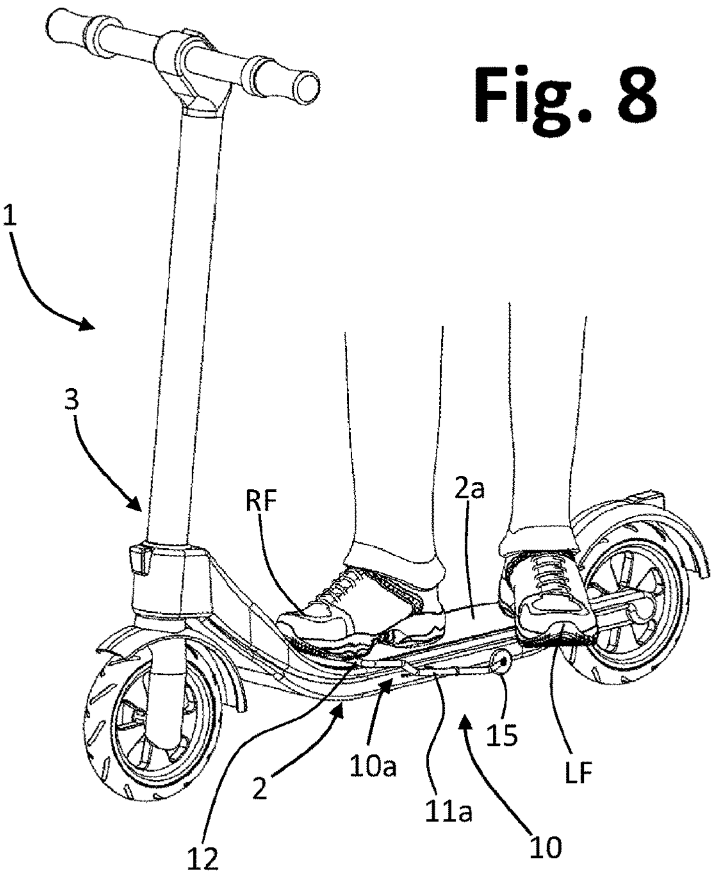
Figure 9:
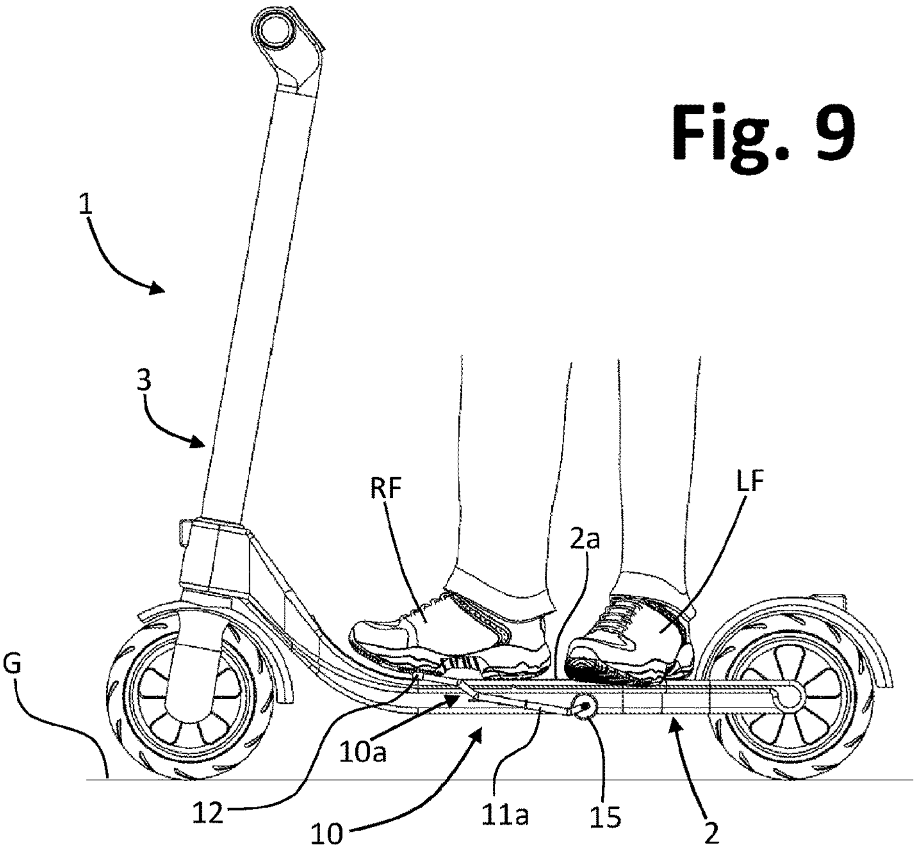
FIGS. 9 and 10 are schematic representations, respectively in side and front elevation on a larger scale, of the scooter in the condition of use of FIG. 8.

From these FIGS. 8-10 it is noted that, in the raised inoperative condition of the kickstand body 10*a*, the two supporting elements 11*a* and 11*b* are substantially arranged laterally to the longitudinal flanks of the platform 2, in a slightly inclined position, but in any case with the end wheels 15 well raised and spaced apart from the ground G (see in particular FIGS. 9-10). The scooter 1 can therefore be used in the usual ways.

When necessary, for example at the end of a move, the user has nothing to do but remove the first foot RF from the footboard 2*a*, thereby removing the pressure on the operable element 12: in this way, thanks to the clastic reaction of the springs 14*a* and 14*b*, the kickstand device 10 will automatically return to the lowered operating position, with the wheels 15 in contact with the ground, as in FIGS. 1-3 and 6. As mentioned, the presence of the wheels 15 that are pressed to the ground due to the effect of the springs 14*a* and 14*b* is not an obstacle to any movement of the scooter 1, for the purpose of its orderly parking, for example at the side of a sidewalk.

It will be appreciated that, in the normal use of a scooter of the type considered herein, after starting the march, one of the user's feet remains practically always resting on the corresponding platform, without the need for changes in its posture: the use of the proposed kickstand device 10 therefore does not imply any action other than those normally required for the use of a scooter. This applies both to the case of a scooter that is moved thanks to a push given through the other foot of the user, and to the case of a motorized scooter, for example equipped with an electric motor.

It will also be appreciated that the solution according to the invention does not even imply any additional operation in order to bring the kickstand device 10 to its lowered operating position, given that the movement in this position occurs automatically, when the user gets off the scooter 1, removing his foot RF from the footboard 2*a*, and therefore from the operable element 12.

It should also be noted that, if for any reason while driving the scooter 1, the user removes (even inadvertently) the foot RF from the operable element 12 and the kickstand device 10 consequently assumes the lowered position, no particular risks occur, by virtue of the presence of the wheels 15 that are free to rotate on the ground, and by virtue of the fact that the wheels 15 are in any case pushed elastically towards the ground, and therefore with the device 10 that in this case can also adapt its position according to any unevenness of the ground possibly encountered by the wheels 15. From this point of view, it should also be noted that, preferably, the portion of the supporting elements 11*a* and 11*b* that extends below the single fulcrum point, represented by the pivot 13, is inclined towards the rear of the scooter 1, that is, with the lower end represented by the wheels 15 which is in any case in an intermediate area between said fulcrum point and the rear wheel 4 of the scooter 1. This is advantageous in the event that, as mentioned, the user removes the pressure from the operable element 12, so enabling the automatic lowering of the kickstand device 10 even while driving the scooter 1: in this case, in fact, the lower ends of elements 11*a* and 11*b*, will rest elastically on the ground and, thanks to the "backwards" inclination of the same elements 11*a* and 11*b*, there is no interference with the ground which may lead to a sudden stop of the movement of the scooter 1, with consequent possible risks for the user.

In the preferential embodiment shown, a supporting element 11*a* or 11*b*, or each supporting element 11*a* and 11*b*, is pivoted on the platform 2 at a respective longitudinal flank of the platform 2, but this does not constitute an essential feature. In fact, in other embodiments, the platform 2 could, for example, comprise a more or less central passage (with respect to the longitudinal axis of the platform), through which the kickstand body extends, with a corresponding pivot mounted transversely to that passage, and with the spring or springs mounted on a portion of that pivot extending through the passage, similar to what was previously described. In such a case, the operable element could also be configured substantially as a pedal, associated with an upper part of the kickstand body that protrudes inclined from the aforementioned passage, above the level of the support plane for the user's feet. In a configuration of this type it is not necessary that the kickstand body has two supporting elements that both extend through the aforementioned passage: the kickstand body could in fact define a single supporting element having, for example, a substantially fork configuration or inverted "Y" configuration, with two divergent or parallel lower arms (possibly provided with the wheels 15) intended for resting on the ground, and the upper common arm passing through the aforementioned passage, and hinged at this passage (as mentioned, preferably through a single pivot provided with one or two springs).

Figure 11:
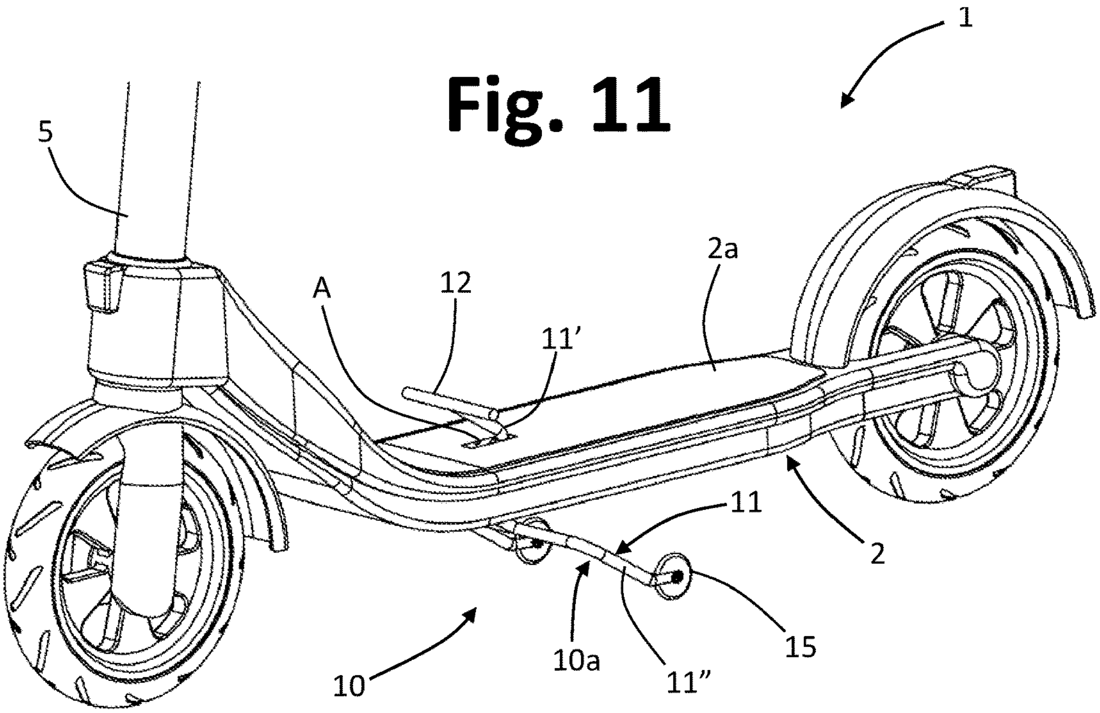
FIG. 11 is a schematic perspective view of a portion of a scooter according to possible variant embodiments of the invention.
Figure 12:
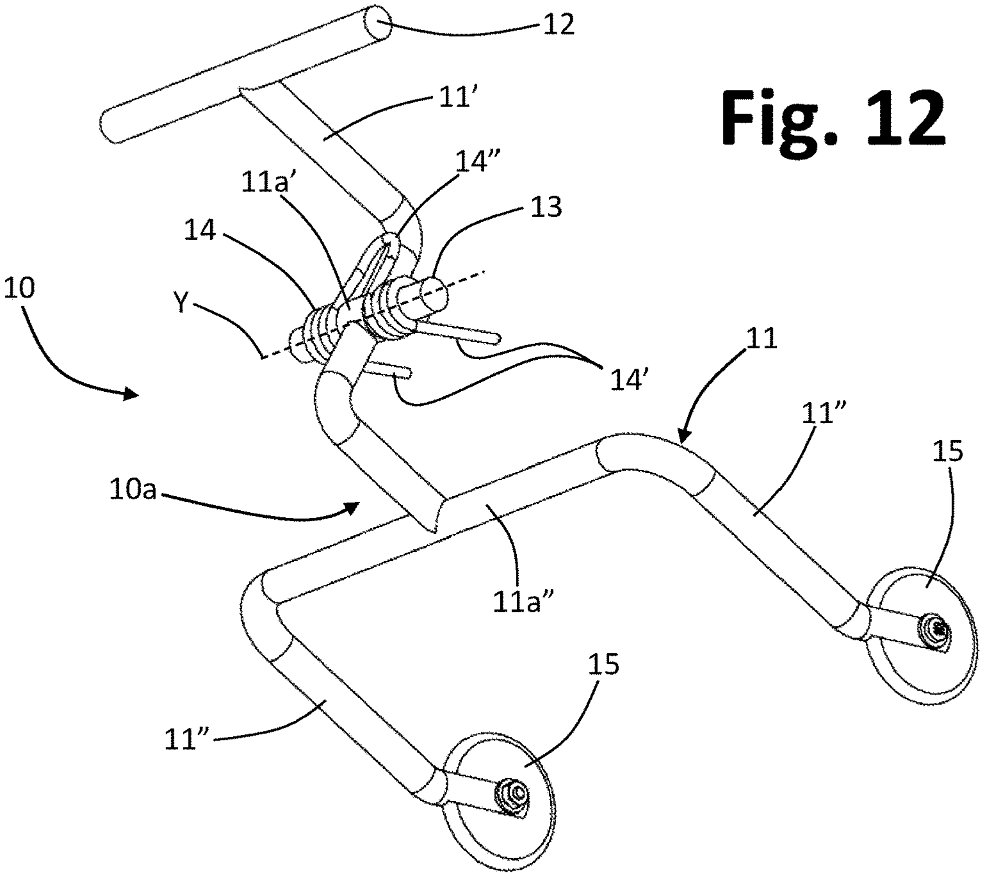
Figure 15:
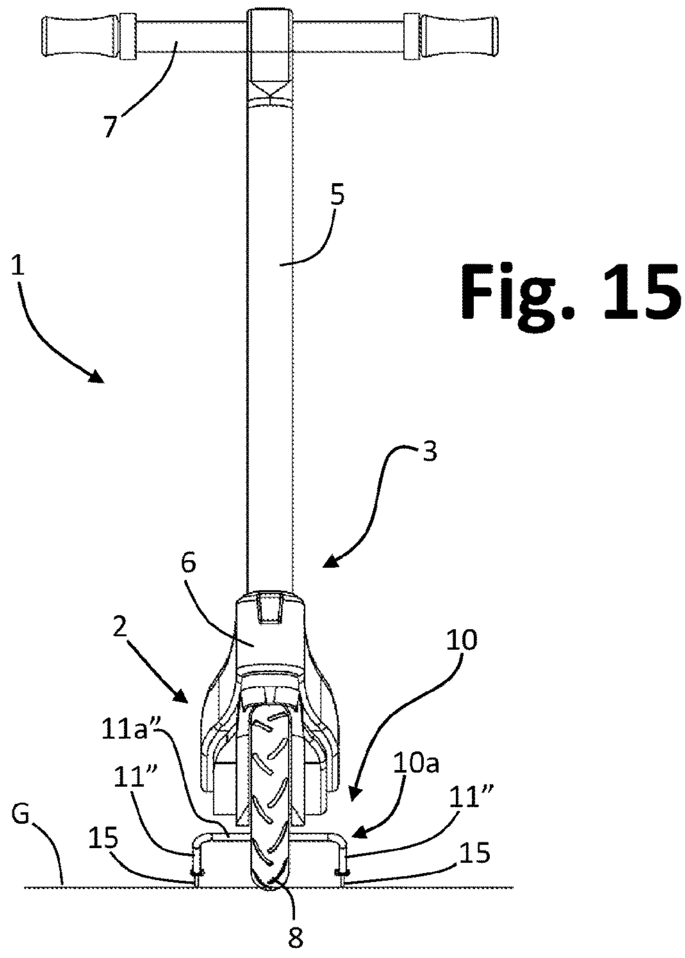

An embodiment of this type is shown in FIGS. 11-19, which use the same reference numbers as the previous figures, to indicate elements technically equivalent to those already described. Referring initially to FIG. 11, in the case exemplified, the platform 2, with its footboard or support surface 2*a*, has a through passage or opening A through which part of the kickstand body 10*a* extends. An example of such device 10 is shown in isolation and in exploded view in FIGS. 12 and 13.

As can be seen, in this case, the kickstand body 10*a* has a supporting element 11 that includes an upper arm 11' and a lower fork element, here including two supporting arms 11" substantially parallel, connected to each other by a transverse arm 11*a*" from which the upper common arm 11' extends.

At the upper end of the upper arm 11' is the operable element 12, here generally parallel to the axis of rotation Y. Preferably, the upper arm 11' has an intermediate transverse seat, designated by 11*a*' in FIG. 13, for the rotation pin 13 on which at least one elastic element 14 is fitted. In the example, the upper arm 11' has two elbows, between which there is defined a portion of the arm in which the seat 11*a*' is located. Again referring to the non-limiting example shown in FIGS. 12-13, the elastic element 14 is represented here by a double torsion spring, whose spirally wound parts are fitted on respective portions of the pin that protrude at the two sides of the 11*a*' seat (see FIG. 12).

As seen in FIGS. 14 and 16, in the assembled condition, the upper arm 11' of the supporting element 11 is passing through the opening A of the platform 2, with the two opposite ends of the pin 13 being constrained in corresponding (not visible) seats defined on the opposite side walls of such opening A. The spring 14, which as mentioned is fitted on the pin 13, has its two free ends 14' that cooperate with the platform 2 (for example they are inserted in corresponding holes on a wall of the opening A which is orthogonal to the walls at which the pin 13 is mounted), while the opposite common end 14" is resting on the kickstand body 10*a*, in particular on the upper arm 11'. In any case, even in this case the arrangement is such that at least one spring 14 urges the kickstand body 10*a*, or the supporting element 11, to assume the respective lowered operating position shown for example in FIGS. 11 and 14; in this position, the lower end part of the at least one supporting element 11, represented by the wheels 15 that equip the two lower arms 11", are resting on the ground G, as also visible in FIG. 15. From FIGS. 11 and 14 it is clear how, also in this case, in the lowered operating position of the device 10, the operable element 12 extends well above the footboard 2*a*.

Figure 17:
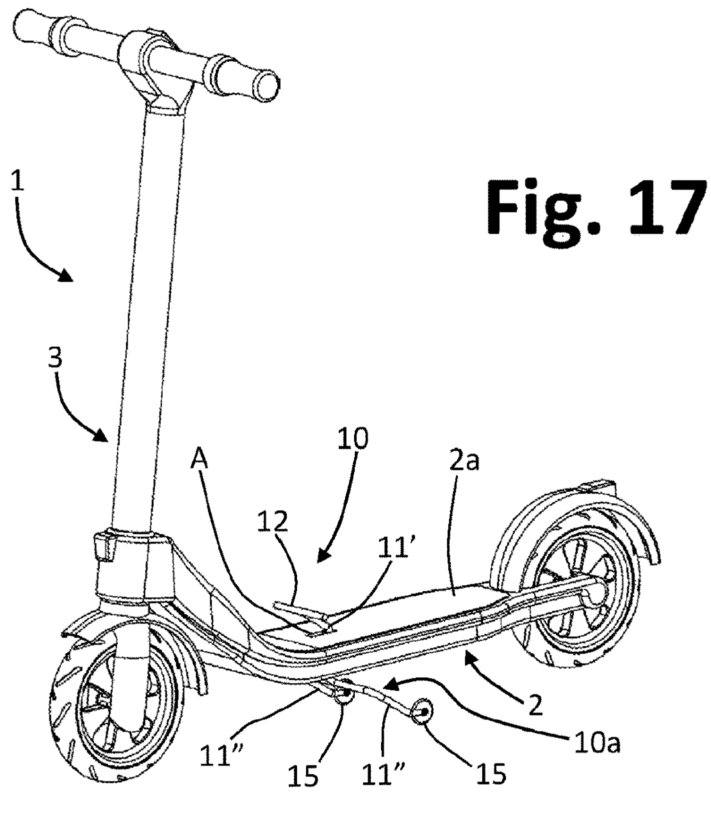
FIGS. 17, 18 and 19 are schematic perspective representations aimed at exemplifying a possible mode of use of a scooter in accordance with possible variant embodiments.

The method of use of the kickstand device 10 of FIGS. 11-15 is similar to that already described above with reference to FIGS. 1-10. FIG. 17 illustrates the scooter 1 in the parking mode, already highlighted in FIGS. 11, 14 and 15, in which the kickstand device 10 (or the supporting element 11 of the kickstand body 10*a*) is in the lowered operating position, thanks to the reaction force of the elastic element represented by the spring 14. In this condition, the wheels 15 that obtains the lower ends of the supporting element 11 are in contact with the ground. In the preferential case shown, given the presence of the two lower arms 11 "generally parallel to each other, the scooter 1 is supported in a substantially vertical position. Of course the spring 14 is sized for the purpose.

Figure 18:
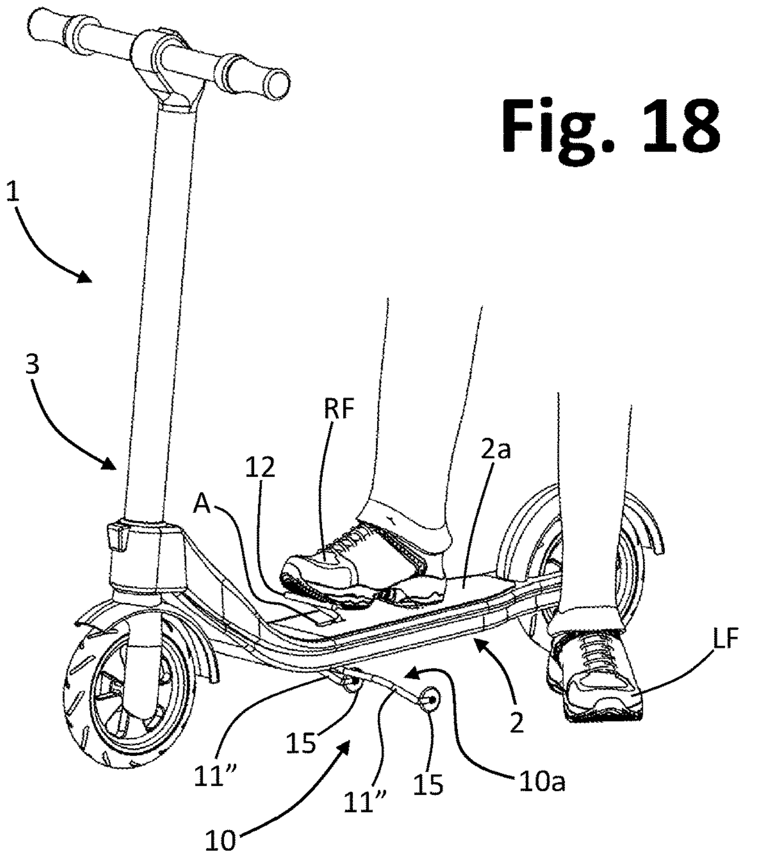

FIG. 18 shows the scooter 1 in a start-up mode, in which the user begins to rest his right foot on the footboard 2*a*, so as to superimpose part of the sole of the corresponding shoe on the operable element 12. Subsequently, by bringing more weight to the foot RF, or in any case by pressing the foot itself on the operable element 12, the lifting of the kickstand device 10 is induced, that is, passage thereof to the raised inoperative condition, against the action of the spring 14. Of course, the through opening A is adequately sized, in particular in the longitudinal direction X, so as to allow the angular movement of the kickstand body 10*a*, or of the upper arm 11' thereof within the same opening A.

Figure 19:
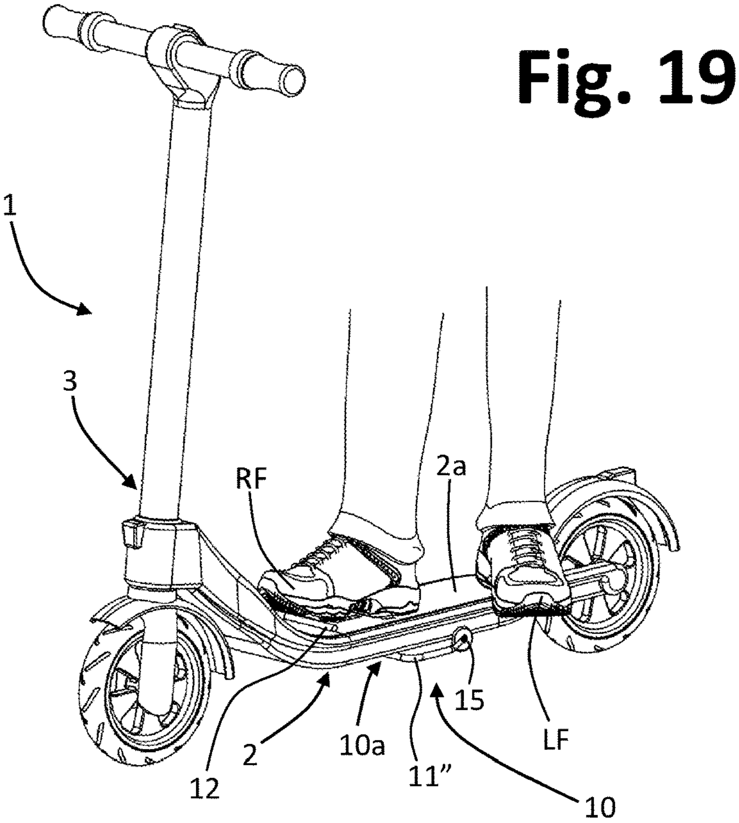

By exerting a push on the ground by means of the second foot LF, the user can then advance the scooter 1 on its wheels 4, 8, possibly also bringing the second foot LF on the footboard 2*a*: a condition of this type is shown in FIG. 19. In the raised inoperative condition of the device 10, the two lower arms 11" are substantially arranged laterally to the longitudinal flanks of the platform 2, with the end wheels 15 well raised and spaced apart from the ground G. The scooter 1 can therefore be used in the usual ways. When necessary, for example at the end of a move, the user has nothing to do but remove the first foot RF from the footboard 2*a*, thereby removing the pressure on the operable element 12: in this way, thanks to the clastic reaction of spring 14, the kickstand device 10 automatically returns to the lowered operating position, with the wheels 15 in contact with the ground, as in FIGS. 11, 14, 15 and 17.

The invention has been illustrated with reference to its preferential embodiment, in which the kickstand device 10 includes two supporting elements 11*a* and 11*b*, or a single supporting element 11 with two lower arms 11", which in their lowered operating position keep the scooter 1 substantially vertical. However, in possible variant embodiments, the device 10 may be designed to include a single supporting element 11*a* or 11*b*, in which case even a single elastic element 14*a* or 14*b* may be used, and a pivot 13 which does not necessarily have to extend through the platform 2, to protrude from both its longitudinal flanks. In an embodiment of this type, at least the portion of the supporting element 11*a* or 11*b* which is below the fulcrum point represented by said pivot shall preferably extend at least slightly outwardly inclined (relative to the longitudinal axis of the platform 2), in order to support the scooter 1 in a position at least slightly inclined.

Similarly, a supporting element of the type indicated with 11 could include a lower arm 11" only, which—also in this case—will have at least one portion that extends at least slightly inclined outwards.

According to a further variant embodiment, the scooter 1 can be equipped with a locking mechanism, for example at the surface or footboard 2*a*, and configured to hold the kickstand device 10 in its inoperative or raised position. Such a locking mechanism is preferably configured to selectively assume at least one engaging condition and one releasing condition, wherein:

- in the engaging condition, the kickstand body is maintained in its inoperative raised position, against the action of the at least one elastic element, even in the absence of a pressure exerted by the user's foot on the operable element, and
- in the releasing condition, the kickstand body is free to assume the respective lowered operating position, thanks to the action of the at least one elastic element, in the absence of a pressure exerted by the user's foot on the operable element.

The aforementioned locking mechanism may, for example, comprise a locking element configured as a latch or a slider, or even as an angularly movable element, which in the engaging condition mechanically interferes with the operable element or with the kickstand body, in order to prevent passage thereof towards its lowered operating position. In more sophisticated embodiments, the locking mechanism may be of the type known as "push-push", i.e. designed in such a way that switching between the above-mentioned engaging and releasing conditions is achieved by successive pressures of limited travel of the operable element 12.

A possible realization of a mentioned locking mechanism is illustrated in FIGS. 20-28, in which the same reference numbers of the previous figures are used, to indicate elements technically equivalent to those already described.

Referring initially to FIGS. 20 and 21, in this case the locking mechanism comprises a coupling element, designated as a whole by 20, which is mounted angularly movable on the platform 2, in a fore position with respect to the operable element 12 of a device 10, here a device 10 of the type previously described with reference to FIGS. 1-10. The coupling element 20 has a body 21 that protrudes above the support surface or footboard 2*a*. On its side facing the device 10, the body 21 of the element 20 defines a coupling seat 22, suitable for engaging the operable element 12: in the example, given that the operable element 12 has a tubular shape of a generally circular cross-section, the coupling seat 22 has a substantially semicircular profile. Preferably, above the seat 22, the body 21 of the element 20—again on its side facing the kickstand device 10—defines a cam profile, suitable of cooperating with the operable element 12; in the example, such a profile is defined by the upper surface of a protruding part 23 of the body 21, here basically in the form of a tooth. The coupling element 20 is shown in an "advanced" position thereof, and is preferably urged in that position by means of a spring or similar elastic element.

FIGS. 20 and 21 refer to a condition similar to that of FIG. 7, or in any case such that the user of the scooter is pressing with the foot RF the operable element 12, to bring the device 10 in its inoperative raised position. In the course of this movement, the operable element 12 firstly comes into contact with the cam profile defined by the protruding part 23, and then perform a relative sliding with respect to said profile: the progressive approach of the operable element 12 to the footboard 2*a* therefore determines an angular backward movement of the body 21, as visible in FIG. 22, that is, its recession with respect to the operable element 12 (in the example the angular movement is counterclockwise, i.e., towards the front wheel 8 of the scooter). This recession occurs in an elastic way, given that the body 21 is elastically urged towards the respective "advanced" position.

Figure 22:
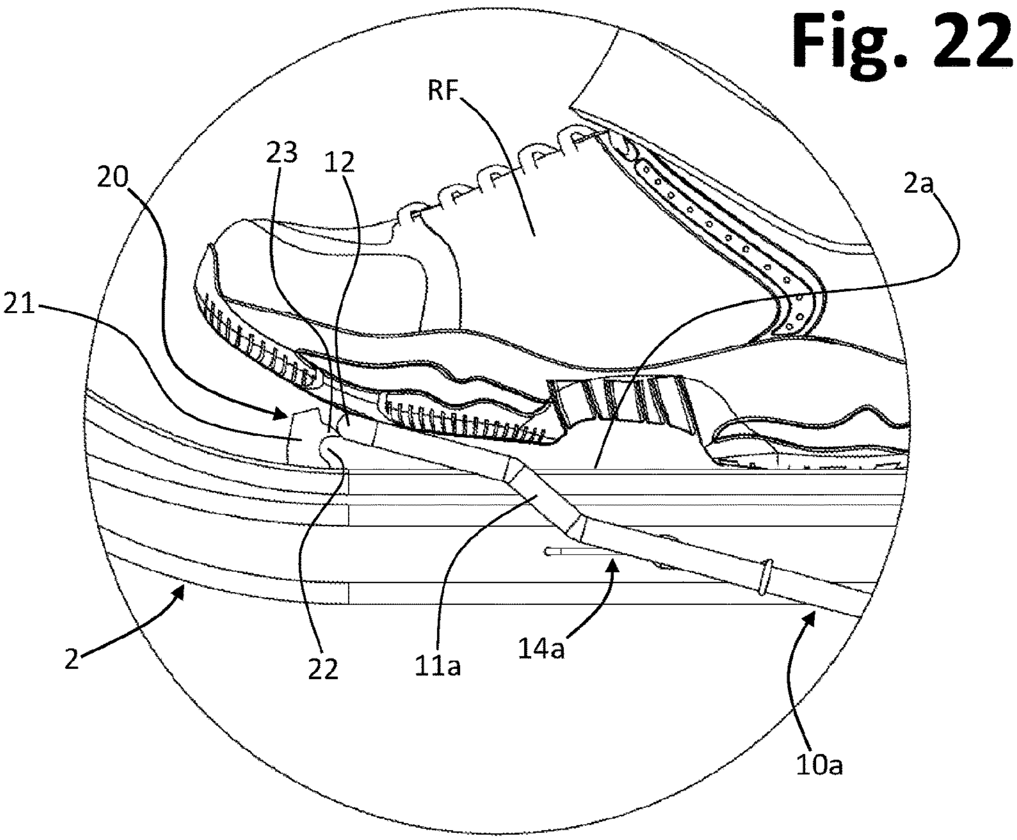
FIGS. 22-23 are views similar to that of FIG. 21, intended to illustrate switching of the locking device to a corresponding engagement position.
Figure 23:
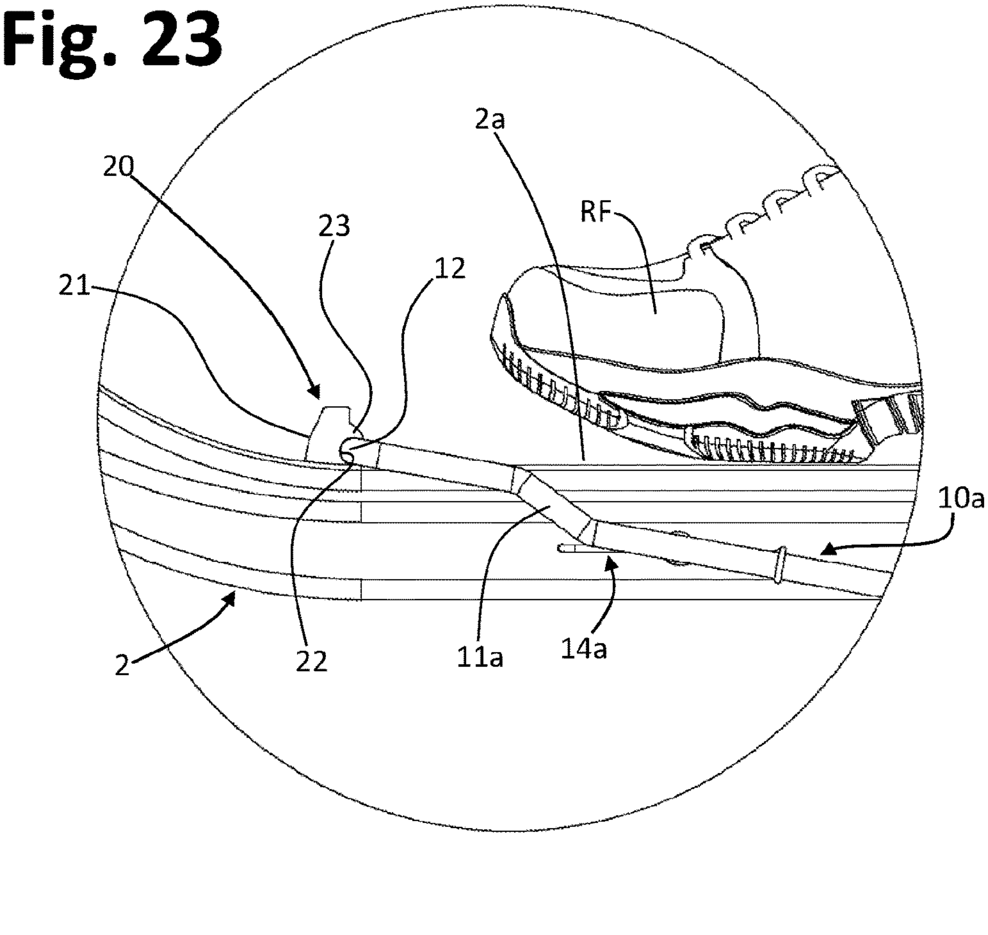

FIG. 22 illustrates the condition in which the sliding of the operable element 12 on the cam profile is almost at the end: thereafter, the operable element 12 goes beyond the protruding part 23 and then engages into seat 22, also thanks to the action of the spring or the like that urges element 20, or its body 21, in the respective "advanced" position. The engaging condition is shown in FIG. 23: as can be seen, even when the pressure on the operable element 12 ceases by the foot RF, the element itself is engaged in the corresponding seat 22 of the coupling element 20, thus maintaining the kickstand device in the respective inoperative raised position. In the example shown the locking condition is obtained with the operable element 12 at the end, or almost at the end, of its approach stroke with respect to the footboard 2*a*.

Figure 24:
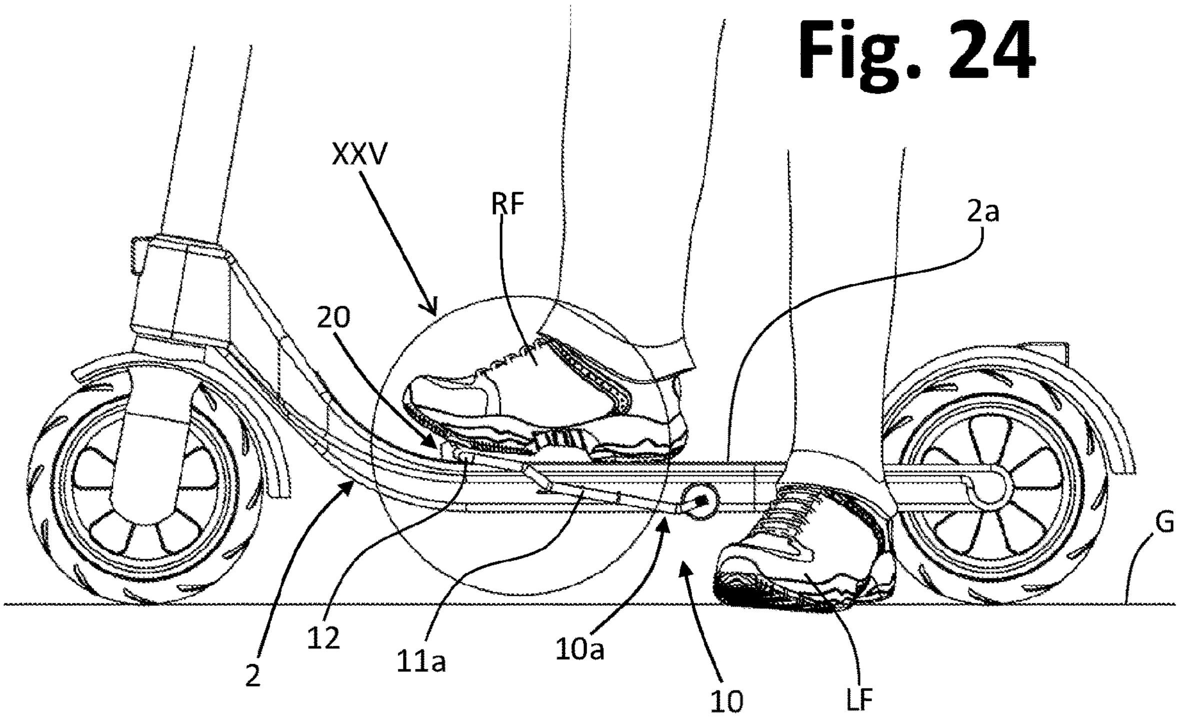
FIG. 24 is a view similar to that of FIG. 20, with the locking mechanism in the course of switching to the release position thereof.
Figure 25:
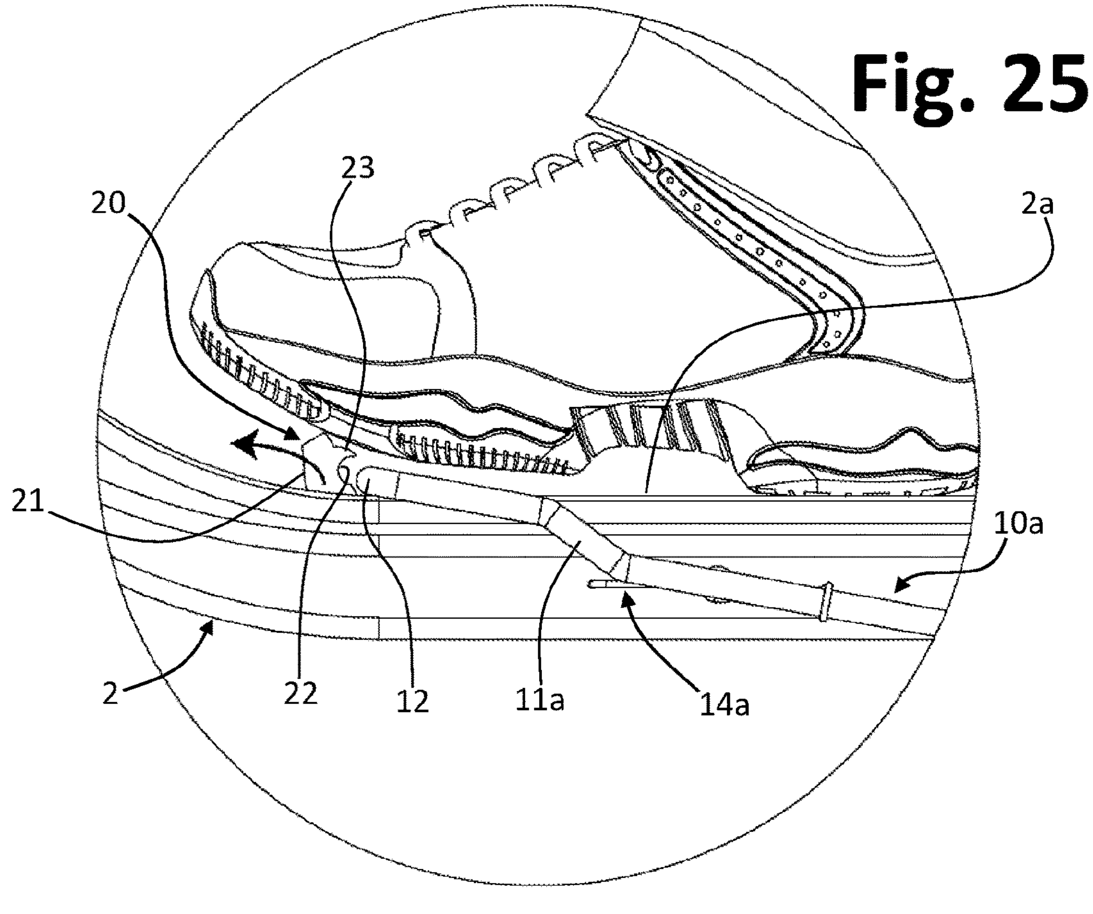
FIG. 25 shows the details XXV of FIG. 24.

FIGS. 24 and 25 refer instead to a phase of release of the locking device. In the case exemplified, the user has nothing to do but push—here again with the right foot RF—the body 21 of the coupling element 20, away from the operable element 12 of the kickstand device 10. As particularly visible in FIG. 25, this can be done simply by causing an angular backward displacement of the element 20 (again counterclockwise, with reference to the example, i.e., towards the wheel 8) of such an extent as to determine the disengagement of the operable element 12 from the seat 22 and a recession of the protruding part 23 such as to allow the upward angular displacement of the operable element 12: in this "rearward" position of the element 20 the kickstand device 10, under the action of the at least one elastic element thereof, is free to return to the lowered operating position, as visible for example in FIG. 26. Note that FIG. 25 illustrates a "static" condition in which the operable element 12 is lowered with respect to the sole of the shoe of the foot RF, only to show disengagement thereof from seat 22: in reality, however, precisely by virtue of the action of the at least one elastic element of the kickstand device 10, the operable part 12 will be in contact with the aforementioned sole.

After the operable element 12 has overcome the protruding part 23, the body 21 of the coupling element 20 will be urged by its elastic element to return to its "advanced" position, as shown in FIG. 26.

Figure 28:
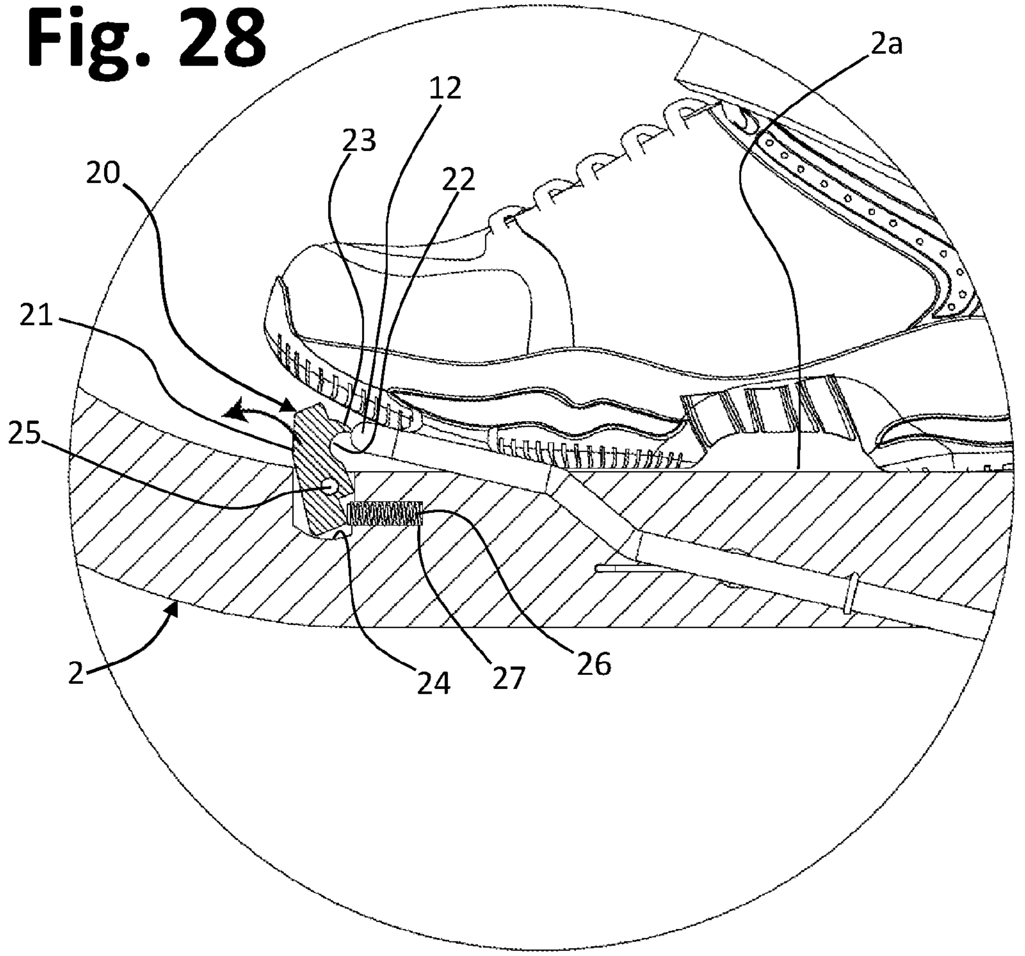

A possible practical embodiment of the locking mechanism including the coupling element 20 is visible in FIGS. 27 and 28. In the case exemplified, the platform 2 defines a seat or cavity 24, open at the footboard or support surface 2*a*, in which the body 21 of the coupling element 20 is partially housed, here configured as a first-class lever. The body 21 is hinged in an intermediate part to the platform 2 via a respective transverse pin 25 (here substantially parallel to the axis of rotation Y of the kickstand device 10). The pin 25 is bound in corresponding location seat at the two lateral surfaces of the seat 24, with the latter being sized so that the body 21 is susceptible to angular displacements between its respective "advanced" (shown in FIG. 27) and "backward" (shown in FIG. 28) positions. The body 21 is urged by a respective elastic element, here represented by a helical spring 26, towards the respective "advanced" position: in the example, for this purpose, in the platform 2 a housing 27 is defined for the spring 26, which opens in the seat 24; one end of spring 26 abuts against the bottom of the housing 27 thereof, while the opposite end abuts against a corresponding seat or positioning zone defined by the body 21, below the fulcrum point represented by the pin 25.

As mentioned, the spring 26 urges the body 21 in the respective "advanced" position, as shown in FIG. 27. Instead, by pushing the operable element 12 downwards, as shown in FIG. 28, so that the element itself slides on the cam profile represented by the upper surface of the front protruding part 23, the body 21 can move angularly backwards, to the "backward" position, against the action of the spring 26, which is compressed. Of course the same thing happens when it is body 21—for example in the situation described with reference to FIG. 25—that is directly pushed backwards.

It will be appreciated that the locking mechanism exemplified with reference to FIGS. 20-28 can also be used in the case of a kickstand device 10 of the type exemplified in FIGS. 11-19.

From the given description, the characteristics of the present invention are clear, as well as its advantages, such as the simplicity, practicality, cheapness and compactness of the kickstand device. It is clear that numerous variants are possible for the person skilled in the art to the scooter described by way of example, without departing from the scope of the invention as defined in the attached claims.

The footboard 2*a*, or in any case the surface of the platform 2 dedicated to the support of the user's feet, may have a seat or a recess, aimed at receiving the operable element 12 when this is pressed thoroughly through a foot, so as not to protrude beyond the support surface and therefore not constitute an element of inconvenience for the posture of the foot in question.

The scooter according to the invention can of course be of a motorized type, that is, equipped with at least one motor, preferably an electric motor with an associated rechargeable battery.

According to a technique in itself known, the scooter 1 can be equipped with at least one articulation mechanism, configured to make the scooter itself foldable. For example, the platform 2 and the guiding structure 3, in particularly the sleeve 5, may be configured to enable a relative movement of orientation around an articulation axis, between an unfolded position of use of the scooter 1 and a folded position, for its transport. To this end, the scooter 1 will also be equipped with suitable blocking means, to securely lock the platform and the driving structure in the aforementioned position of use.

The guiding structure 3, especially the column 6, can be of a telescopic type, in order to allow both height adjustment and retraction in a position of minimum encumbrance. To this end, column 6 can advantageously include elements for limiting the corresponding sliding movement of the telescopically coupled parts, both in the direction of extension (to avoid the unwanted separation of the part bearing the handlebar 7), and in the direction of retraction (to avoid an equally unwanted sudden contraction movement of the column 6 while the scooter 1 is being used). Even the handlebar 7 can be obtained so as to be selectively foldable close to the column 6, or to be selectively removable with respect to the column 6, again in order to allow to give the scooter 1 a compact structure when the same must be transported.

The amplitude of the steering movement can also be selectively adjusted—by known means—within a given angular range: this in order to avoid, for example, that the front wheel 8 can be brought "sideways", which could give rise to a situation of use possibly dangerous.

The scooter 1 can also have hooking formations associated thereto (such as eyelets or hooks—not illustrated) that allow the connection of a shoulder strap or belt for transport, especially in the folded condition.

In embodiments where the scooter 1 is electrically driven, the same could be equipped with a seat or similar for the user.

The invention claimed is:

1. A scooter comprising a platform with a guiding structure associated therewith, the platform being mounted on wheels and having a support surface suitable for supporting at least one foot of a user, the platform having associated thereto a kickstand device, wherein the kickstand device has a kickstand body, which includes at least one supporting element and has an upper end portion and at least one lower end portion, the kickstand body being articulated in an intermediate area thereof to the platform, to perform angular movements about a respective rotation axis extending transversely with respect to a direction of longitudinal extension of the platform, wherein at least one elastic element is operatively set between the kickstand body and the platform, configured for urging the kickstand body to assume a respective operative lowered position, in which a lower end part of the at least one supporting element is designed to contact the ground, wherein the upper end portion of the kickstand body defines or has associated thereto an operable element, configured so as to extend at least partially above the supporting surface of the platform, and suitable for being pressed by the aforementioned foot of the user, in such a way that the kickstand body is brought to assume a respective inoperative raised position, against the action of the at least one elastic element, in which the lower end part of the at least one supporting element is raised with respect to the ground, wherein the at least one supporting element of the kickstand body includes one first supporting element and one second supporting element, each articulated in a respective intermediate area to the platform, the first supporting element and the second supporting element having respective upper end parts connected together via the operable element, and wherein the first supporting element, the second supporting element and the operable element are defined at least in part by one and the same body substantially U-shaped.

2. The scooter according to claim 1, wherein the operable element extends substantially transversally with respect to the direction of longitudinal extension of the platform.

3. The scooter according to claim 2, wherein the operable element extends in a direction substantially parallel to the rotation axis of the kickstand body.

4. The scooter according to claim 1, wherein the lower end portion of the at least one supporting element comprises a wheel, which is rotatable about an axis which is substantially parallel to the rotation axis of the kickstand body.

5. The scooter according to claim 1, wherein the at least one elastic element comprises one first elastic element and one second elastic element, which are configured for urging the first supporting element and the second supporting element, respectively, to assume a respective lowered position.

6. The scooter according to claim 1, wherein the first supporting element and the second supporting element are hinged to the platform, in the respective intermediate area, via one and the same pivot.

7. The scooter according to claim 6, wherein the one and the same pivot extends through the platform in a transverse direction with respect to the direction of longitudinal extension of the platform.

8. The scooter according to claim 1, wherein the kickstand body is configured as a first-class lever.

9. The scooter according to claim 1, wherein the at least one elastic element is a spring.

10. The scooter according to claim 1, wherein the first supporting element and the second supporting element are each articulated at a respective longitudinal flank of the platform.

11. The scooter according to claim 1, wherein the one and the same body substantially U-shaped is a substantially tubular body, and the first supporting element and the second supporting element are parallel to one another.

12. A scooter comprising a platform with a guiding structure associated therewith, the platform being mounted on wheels and having a support surface suitable for supporting at least one foot of a user, the platform having associated thereto a kickstand device, wherein the kickstand device has a kickstand body, which includes at least one supporting element and has an upper end portion and at least one lower end portion, the kickstand body being articulated in an intermediate area thereof to the platform, to perform angular movements about a respective rotation axis extending transversely with respect to a direction of longitudinal extension of the platform, wherein at least one elastic element is operatively set between the kickstand body and the platform, configured for urging the kickstand body to assume a respective operative lowered position, in which a lower end part of the at least one supporting element is designed to contact the ground, wherein the upper end portion of the kickstand body defines or has associated thereto an operable element, configured so as to extend at least partially above the supporting surface of the platform, and suitable for being pressed by the aforementioned foot of the user, in such a way that the kickstand body is brought to assume a respective inoperative raised position, against the action of the at least one elastic element, in which the lower end part of the at least one supporting element is raised with respect to the ground, wherein the kickstand device comprises at least one pivot for hinging the kickstand body, or the at least one supporting element, to the platform, and wherein the at least one elastic element comprises a torsion spring fitted on at least one portion of the pivot, with an end of the torsion spring constrained to, or resting on, the platform, and the other end of the torsion spring constrained to, or resting on, the kickstand body.

13. The scooter according to claim 12, wherein the at least one pivot is at a longitudinal flank of the platform or at a through-opening of the platform.

14. A scooter comprising a platform with a guiding structure associated therewith, the platform being mounted on wheels and having a support surface suitable for supporting at least one foot of a user, the platform having associated thereto a kickstand device, wherein the kickstand device has a kickstand body, which includes at least one supporting element and has an upper end portion and at least one lower end portion, the kickstand body being articulated in an intermediate area thereof to the platform, to perform angular movements about a respective rotation axis extending transversely with respect to a direction of longitudinal extension of the platform, wherein at least one elastic element is operatively set between the kickstand body and the platform, configured for urging the kickstand body to assume a respective operative lowered position, in which a lower end part of the at least one supporting element is designed to contact the ground, wherein the upper end portion of the kickstand body defines or has associated thereto an operable element, configured so as to extend at least partially above the supporting surface of the platform, and suitable for being pressed by the aforementioned foot of the user, in such a way that the kickstand body is brought to assume a respective inoperative raised position, against the action of the at least one elastic element, in which the lower end part of the at least one supporting element is raised with respect to the ground, the scooter also comprising a locking mechanism, prearranged for selectively assuming an engaging condition and a releasing condition, wherein:

in the engaging condition the kickstand body is kept in the respective inoperative raised position, against the action of the at least one elastic element, even in absence of a pressure exerted by the foot of the user upon the operable element, and in the releasing condition the kickstand body is free to assume the respective operative lowered position, by virtue of the action of the at least one elastic element, in absence of a pressure exerted by the foot of the user upon the operable element.

15. The scooter according to claim 14, wherein the locking mechanism comprises a coupling element mounted on the platform to be angularly movable, about a rotation axis generally parallel to the axis of rotation of the kickstand body, at least one respective elastic element configured for urging the coupling element in a respective advanced position, the coupling element being angularly displaceable in a backward position against the action of the corresponding elastic element, wherein:

with the kickstand body in the inoperative raised position and the coupling element in the advanced position, the coupling element holds the operable element, and by displacing the coupling element in the backward position, the coupling element frees the operable element.

16. The scooter according to claim 15, wherein the at least one respective elastic element of the locking mechanism is a spring.

17. A scooter comprising a platform with a guiding structure associated therewith, the platform being mounted on wheels and having a support surface suitable for supporting at least one foot of a user, the platform having associated thereto a kickstand device, wherein the kickstand device has a kickstand body, which includes at least one supporting element and has an upper end portion and at least one lower end portion, the kickstand body being articulated in an intermediate area thereof to the platform, to perform angular movements about a respective rotation axis extending transversely with respect to a direction of longitudinal extension of the platform, wherein at least one elastic element is operatively set between the kickstand body and the platform, configured for urging the kickstand body to assume a respective operative lowered position, in which a lower end part of the at least one supporting element is designed to contact the ground, wherein the upper end portion of the kickstand body defines or has associated thereto an operable element, configured so as to extend at least partially above the supporting surface of the platform, and suitable for being pressed by the aforementioned foot of the user, in such a way that the kickstand body is brought to assume a respective inoperative raised position, against the action of the at least one elastic element, in which the lower end part of the at least one supporting element is raised with respect to the ground, and wherein:

the at least one supporting element passes through an opening of the platform, the at least one supporting element having an upper arm passing through said opening and having at the upper end the operable element, and at least one lower arm with a respective lower end part designed for contact with the ground, the kickstand body is articulated to the platform substantially at the opening, for rotating about the corresponding rotation axis.

18. The scooter according to claim 17, wherein the at least one lower arm comprises two lower arms, a lower portion of the at least one supporting element being substantially fork-shaped.

* * * * *